(12) United States Patent
Yoshioka et al.

(10) Patent No.: US 8,224,541 B2
(45) Date of Patent: Jul. 17, 2012

(54) HYDRAULIC CONTROL DEVICE FOR AUTOMATIC TRANSMISSION

(75) Inventors: Yuhei Yoshioka, Anjo (JP); Kazuyuki Noda, Anjo (JP); Naoki Itazu, Nagoya (JP); Yoshinobu Nozaki, Anjo (JP)

(73) Assignees: Aisin AW Co., Ltd., Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 367 days.

(21) Appl. No.: 12/546,726

(22) Filed: Aug. 25, 2009

(65) Prior Publication Data

US 2010/0082209 A1    Apr. 1, 2010

(30) Foreign Application Priority Data

Sep. 30, 2008    (JP) .................................. 2008-255841

(51) Int. Cl.
G06F 7/00    (2006.01)
(52) U.S. Cl. .......................................... 701/62; 477/125
(58) Field of Classification Search .................... 701/62; 477/125
See application file for complete search history.

(56) References Cited

U.S. PATENT DOCUMENTS

| 5,409,434 | A | 4/1995 | Furukawa et al. | |
|---|---|---|---|---|
| 5,505,674 | A | 4/1996 | Furukawa et al. | |
| 5,665,020 | A * | 9/1997 | Kamada et al. | 475/129 |
| 5,810,694 | A * | 9/1998 | Kamada et al. | 477/150 |
| 5,888,169 | A * | 3/1999 | Jang | 477/130 |
| 5,957,809 | A * | 9/1999 | Jang | 477/149 |
| 6,527,670 | B1 | 3/2003 | Gierer et al. | |
| 7,905,807 | B2 * | 3/2011 | Shimizu et al. | 475/5 |
| 2007/0161448 | A1 | 7/2007 | Sato et al. | |
| 2007/0161449 | A1 * | 7/2007 | Hayashi et al. | 475/130 |
| 2007/0167283 | A1 | 7/2007 | Sato et al. | |
| 2008/0200301 | A1 * | 8/2008 | Shimizu et al. | 477/2 |

FOREIGN PATENT DOCUMENTS

| JP | 5-215228 A | 8/1993 |
|---|---|---|
| JP | 11-230328 A | 8/1999 |
| JP | 2002-533631 A | 10/2000 |
| JP | 2007-177932 A | 7/2002 |

* cited by examiner

*Primary Examiner* — Behrang Badii
*Assistant Examiner* — Shardul Patel
(74) *Attorney, Agent, or Firm* — Sughrue Mion, PLLC

(57) ABSTRACT

A hydraulic control device for an automatic transmission that includes a fail-safe function to establish a fail-safe traveling state where a predetermined shift speed is established, and a fail-safe stopping state where the primary pressure to all of the hydraulic servos is cut-off when a failure occurs. The hydraulic control device is able to switch between the fail-safe traveling state and the fail-safe stopping state even after a failure occurs, thereby enhancing a limp-mode function.

5 Claims, 7 Drawing Sheets

FIG. 2

|  | C-1 | C-2 | C-3 | C-4 | B-1 | B-2 | F-1 |
|---|---|---|---|---|---|---|---|
| P |  |  |  |  |  |  |  |
| REV |  |  |  | ○ |  | ○ |  |
| N |  |  |  |  |  |  |  |
| 1ST | ○ |  |  |  |  | (○) | ○ |
| 2ND | ○ |  |  |  | ○ |  |  |
| 3RD | ○ |  | ○ |  |  |  |  |
| 4TH | ○ |  |  | ○ |  |  |  |
| 5TH | ○ | ○ |  |  |  |  |  |
| 6TH |  | ○ |  | ○ |  |  |  |
| 7TH |  | ○ | ○ |  |  |  |  |
| 8TH |  | ○ |  |  |  | ○ |  |

(○): DURING ENGINE BRAKING

FIG. 5

[SOL OPERATION TABLE]

| RANGE | | ON/OFF | | | | | L | | ID | |
|---|---|---|---|---|---|---|---|---|---|---|
| | | S1 N/C | S2 N/C | S4 N/O | SL1 N/C | SL2 N/C | | | SL4 N/C | SL5 N/C |
| P | | × | ○ | ○ | × | × | | | × | × |
| R | | ○ | × | ○ | × | ○ | | | ○ | × |
| N | | ○ | × | ○ | ○ | × | | | × | × |
| D | 1st | × | × | ○ | ○ | × | | | × | × |
| | 1st/E/B | ○ | × | ○ | ○ | ○ | | | × | ○ |
| | 2nd | × | × | ○ | ○ | × | | | × | × |
| | 3rd | × | × | ○ | ○ | × | | | × | × |
| | 4th | × | × | ○ | ○ | ○ | | | ○ | × |
| | 5th | × | × | ○ | × | ○ | | | × | × |
| | 6th | × | × | ○ | × | ○ | | | ○ | × |
| | 7th | × | × | ○ | × | ○ | | | × | × |
| | 8th | × | × | ○ | × | ○ | | | × | ○ |

F I G . 6
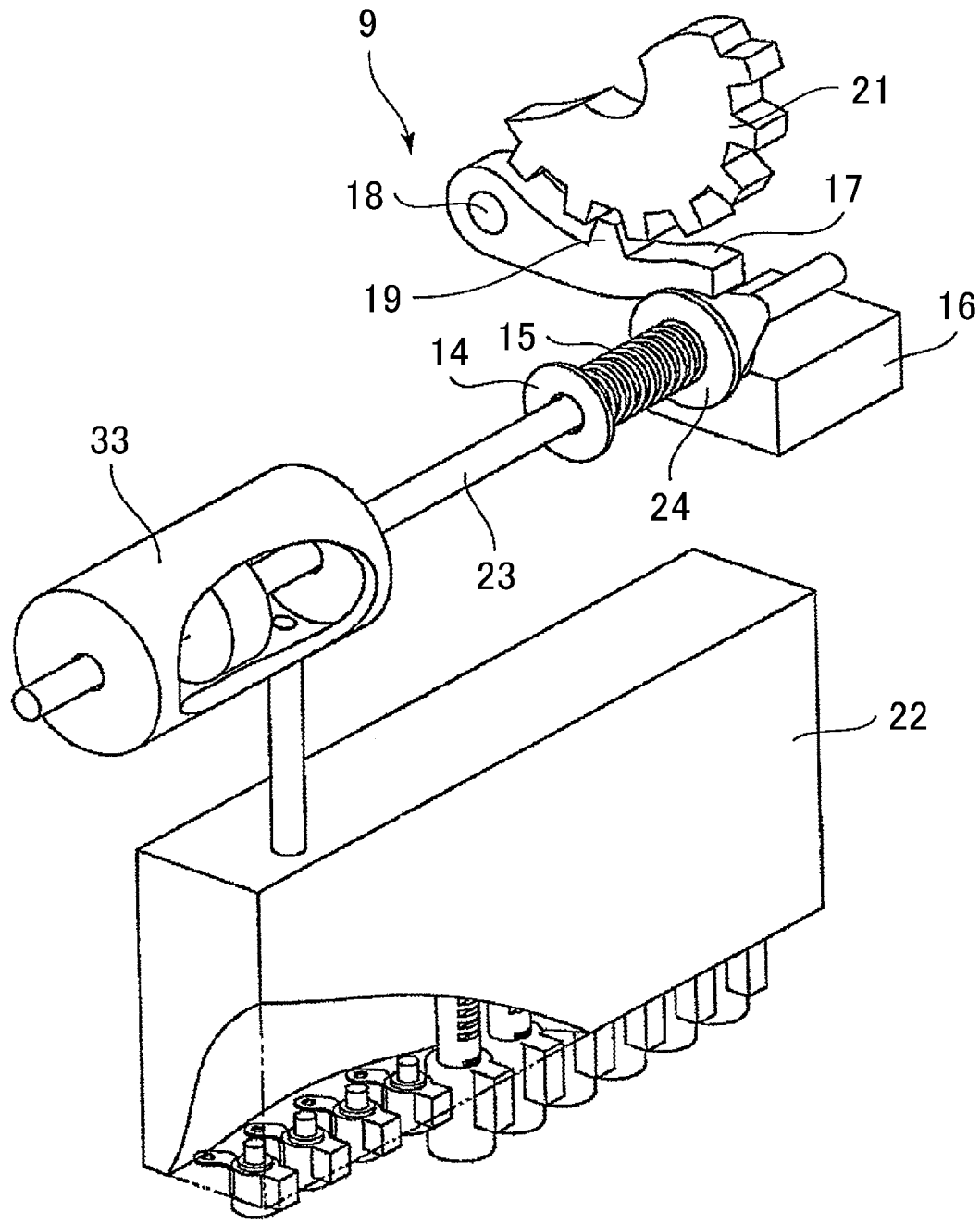

HYDRAULIC CONTROL DEVICE FOR AUTOMATIC TRANSMISSION

INCORPORATION BY REFERENCE

The disclosure of Japanese Patent Application No. 2008-255841 filed on Sep. 30, 2008 including the specification, drawings and abstract is incorporated herein by reference in its entirety.

BACKGROUND OF THE INVENTION

The present invention generally relates to a hydraulic control device for an automatic transmission mounted on, for example, a vehicle. More particularly, the present invention relates to a hydraulic control device for an automatic transmission which has a fail-safe function to establish a fail-safe traveling state where a predetermined shift speed is established, and a fail-safe stopping state where the primary pressure to all of the hydraulic servos is cut off, when a failure occurs due to, for example, computer failure, wire disconnection, or the like.

DESCRIPTION OF THE RELATED ART

With recent improvement in output performance of a linear solenoid valve, a hydraulic control device of an automatic transmission has been structured so that an engaging pressure regulated by the linear solenoid valve is directly supplied to a hydraulic servo of a clutch or a brake. When a normally open (N/O) type valve is used as the linear solenoid valve, power consumption increases in the state where the clutch or the brake corresponding to the linear solenoid valve is not engaged, which hinders improvement in fuel consumption of vehicles. Thus, it is preferable to form the linear solenoid valve as a normally closed (N/C) type valve.

On the other hand, when a so-called "all-solenoids-off failure," occurs in which solenoid valves including the above linear solenoid valves are all de-energized due to, for example, a failure of a control computer (ECU), wire disconnection, or the like, the normally closed type solenoid valves as described above outputs no hydraulic pressure, that is, no engaging pressure is supplied to the hydraulic servos. Thus, especially if the all-solenoids-off failure occurs when the vehicle is traveling, no shift speed can be established, resulting in a neutral state.

Thus, a hydraulic control device has been proposed in which linear solenoid valves are formed as normally closed type valves and a hydraulic pressure is reversely input from exhaust ports of predetermined linear solenoid valves (see Japanese Patent Application Publication No. JP-A-2007-177932). In this hydraulic control device, if, for example, an all-solenoids-off failure occurs when the vehicle is traveling, a forward-travel-range pressure is reversely input to exhaust ports of linear solenoid valves SLC2, SLC3 connected to a second clutch C-2 and a third clutch C-3 which establish the seventh forward speed. This improves the fuel consumption in a normal state, and also achieves a fail-safe function by establishing the seventh forward speed when a failure occurs.

SUMMARY OF THE INVENTION

The hydraulic control device described in Japanese Patent Application Publication No. JP-A-2007-177932 is structured so as to switch the P range, the R range, the N range, the D range or the like by using manual shift valves which operate with the shift lever operation. In recent years, however, a hydraulic control device has been considered in which the manual shift valves are abolished, and a so-called shift-by-wire system, which switches the shift range of an automatic transmission by setting a hydraulic pressure by electric commands by using a plurality of solenoid valves, switch valves, and the like, is employed.

The above hydraulic control device, which performs fail-safe operation by reverse input of the linear solenoid valves, uses a forward-travel-range pressure as a hydraulic pressure that is reversely input. That is, since the seventh forward speed is not likely to be established in the ranges other than the D range based on the shift lever operation, and especially, the shift range can be manually switched to the D range or a range other than the D range even after the all-solenoids-off failure occurs. Thus, the driver can select forward traveling and neutral, which is sufficient for functioning as a limp-home function.

However, if such a shift-by-wire system is used in the hydraulic control device which performs fail-safe operation by reverse input of the linear solenoid valves, the solenoid valves cannot be driven, that is, a hydraulic pressure cannot be switched, especially after the all-solenoids-off failure occurs. That is, the hydraulic pressure cannot be switched after the all-solenoids-off failure occurs. As a result, the driver may not select forward traveling and neutral.

It is therefore an object of the present invention to provide a hydraulic control device for an automatic transmission that can switch a fail-safe traveling state and a fail-safe stopping state even after a failure occurs, and can enhance a limp-home function.

According to an aspect of the present invention, a hydraulic control device of an automatic transmission is structured so as to establish a plurality of shift speeds by using a plurality of first system solenoid valves which are controlled by a first command system, and so as to establish a fail-safe running state where a primary pressure is supplied to a corresponding hydraulic servo of at least one of friction engagement elements which establishes a predetermined one of the shift speeds, or a fail-safe stopping state where a primary pressure to the hydraulic servos of all of the friction engagement elements is cut off, when a failure occurs in the first command system. The hydraulic control device is characterized by including a second system solenoid valve that is controlled by a second command system and that controls an output state of a signal pressure, and is characterized in that the fail-safe traveling state and the fail-safe stopping state can be switched by the signal pressure of the second system solenoid valve.

Thus, the first command system can control all the shift speeds in a normal state, and the second command system can switch the fail-safe traveling state and the fail-state stopping state when a failure occurs in the first command system. As a result, even when a failure occurs in the first command system, the forward traveling state and the neutral state can be switched by using the second command system, whereby the limp-home function can be enhanced.

According to the aspect of the present invention, the hydraulic control device for an automatic transmission is characterized by further including: a second system switch valve which is switched between a supply position at which the primary pressure is supplied to the hydraulic servo of the friction engagement element which establishes the predetermined shift speed in the fail-safe traveling state and a cutoff position at which the primary pressure is cut off based on the signal pressure of the second system solenoid valve. The hydraulic control device for an automatic transmission is also characterized in that the fail-safe traveling state and the fail-safe stopping state are switched by switching the supply position and the cutoff position.

Thus, since the second system switch valve is switched between the supply position and the cutoff position, based on the signal pressure of the second system solenoid valve, the primary pressure to the hydraulic servos can be reliably switched when a failure occurs in the first command system. That is, the fail-safe traveling state and the fail-safe stopping state can be reliably switched when a failure occurs in the first command system.

More specifically, according to the aspect of the present invention, the hydraulic control device for an automatic transmission is characterized in that the first system solenoid valve includes a plurality of engagement-pressure control solenoid valves that regulate and control respective engagement pressures to be supplied to the hydraulic servos of the friction engagement elements establishing all of the shift speeds, and a fail solenoid valve that outputs a fail signal pressure when the failure occurs. The hydraulic control device for an automatic transmission is also characterized by further including: a distribution switch valve that distributes an engagement pressure from one of the engagement-pressure control solenoid valves to two of the hydraulic servos; a primary-pressure switch valve which is switched from a supply position at which the primary pressure is supplied to the engagement-pressure control solenoid valves, to a reverse input position at which, when the fail signal pressure is received, a reverse input pressure is input to exhaust ports of two of the engagement-pressure control solenoid valves connected to the hydraulic servo of the friction engagement element which establishes the predetermined shift speed so that the primary pressure can be supplied to the two hydraulic servos; and a reverse input oil passage that can transmit the reverse input pressure from the primary-pressure switch valve to the exhaust ports of the two engagement-pressure control solenoid valves through the distribution switch valve. The hydraulic control device for an automatic transmission is also characterized in that the distribution switch valve is controlled to be located at a first position where the engagement pressure can be supplied to one of the two hydraulic servos at least in a reverse travel range, a non-travel range, and at a specific shift speed in a forward travel range, and is controlled to be located at a second position where the engagement pressure can be supplied to the other hydraulic servo in other forward travel ranges, and the distribution switch valve provides a communication with the reverse input oil passage at the second position, and cuts off the reverse input oil passage at the first position. The hydraulic control device for an automatic transmission is also characterized in that the second system switch valve switches the fail-safe traveling state and the fail-safe stopping state by switching supply and cutoff of the reverse input pressure by switching supply and cutoff of the primary pressure to the primary-pressure switch valve.

Thus, when the first command system is in a normal state, the fail-safe traveling state and the fail-safe stopping state are switched by the distribution switch valve that distributes the engagement pressure of one engagement-pressure control solenoid valve to two hydraulic servos in the reverse travel range, the non-travel range, and the forward travel range. Thus, the fail-safe stopping state can be established when a failure of the first command system occurs in the reverse travel range and the non-travel range, and the fail-safe running state can be established when a failure of the first command system occurs in the forward travel range (except for the specific shift speed). Moreover, when the first command system has a failure, the fail-safe traveling state and the fail-safe stopping state can be switched by the second system switch valve.

More specifically, according to the aspect of the present invention, the hydraulic control device for an automatic transmission is characterized in that the distribution switch valve includes a biasing unit that biases a spool to the first position, a forward-travel engagement-pressure input oil chamber that receives an engagement pressure, which is supplied to the corresponding hydraulic servo of at least one of the friction engagement elements engaged upon starting of forward traveling when the first command system is in a normal state so as to switch the spool to the second position against biasing force of the biasing unit, a lock-pressure input oil chamber that receives a lock pressure at the second position to lock the spool to the second position, and an unlock-pressure input oil chamber that receives an unlock pressure for returning the spool locked to the second position, to the first position. The hydraulic control device for an automatic transmission is also characterized in that the forward-travel engagement-pressure input oil chamber is structured so as to receive the signal pressure of the second system solenoid valve when the failure occurs in the first command system.

Thus, the distribution switch valve is structured so as to receive the signal pressure of the second system solenoid valve in the forward-travel engagement-pressure input oil chamber when the first command system has a failure. Thus, when the first command system has a failure, the distribution switch valve can be switched between the first position and the second position by the signal pressure of the second system solenoid valve. Thus, for example, even if a failure occurs in the first command system in the reverse travel range or the non-travel range, and the distribution switch valve is located at the first position, the distribution switch valve can be switched to the second position by the second command system. Thus, the limp-home function can be enhanced.

Moreover, according to the aspect of the present invention, the hydraulic control device for an automatic transmission is characterized in that the first system solenoid valve includes a range setting solenoid valve that is driven based on an operation of shift-range operating unit, and that sets a shift range inside the automatic transmission.

Thus, the hydraulic control device includes, as the first system solenoid valve, the range setting solenoid valve that is driven by operation of the shift-range operating unit, and that sets the shift range inside the automatic transmission. That is, the shift range of the automatic transmission is switched by electric commands. Thus, since the hydraulic control device of the present invention is not configured so that the shift range is manually switched, shifting of the shift range becomes impossible when a failure occurs in the first command system. However, the fail-safe traveling state and the fail-safe stopping state can be switched by the second command system, whereby the limp-home function can be enhanced.

Moreover, according to the aspect of the present invention, the hydraulic control device for an automatic transmission is characterized by further including: a first computer that generates an electric command of the first command system; and a second computer in which at least wires thereof are formed in a separate system from that of the first computer, and that generates an electric command of the second command system.

Thus, the hydraulic control device includes the first computer that generates an electric command of the first command system, and the second computer in which at least wires thereof are formed in a separate system from that of the first computer, and that generates an electric command of the second command system. Thus, the limp-home function can be enhanced by the second command system of the second computer, even if a failure occurs in the first command system due to, for example, a failure of the first computer, disconnection of wires connected to the first computer, coming-off of connectors, or the like.

BRIEF DESCRIPTION OF THE DRAWINGS

FIG. 2 is an operation table of the automatic transmission;

FIG. 5 is an operation table of the hydraulic control device;

FIG. 6 is a schematic diagram showing a parking device; and

DETAILED DESCRIPTION OF THE EMBODIMENTS

Hereinafter, an embodiment of the present invention will be described with reference to FIGS. 1 through 7B.

[Structure of Automatic Transmission]

Figure 1:
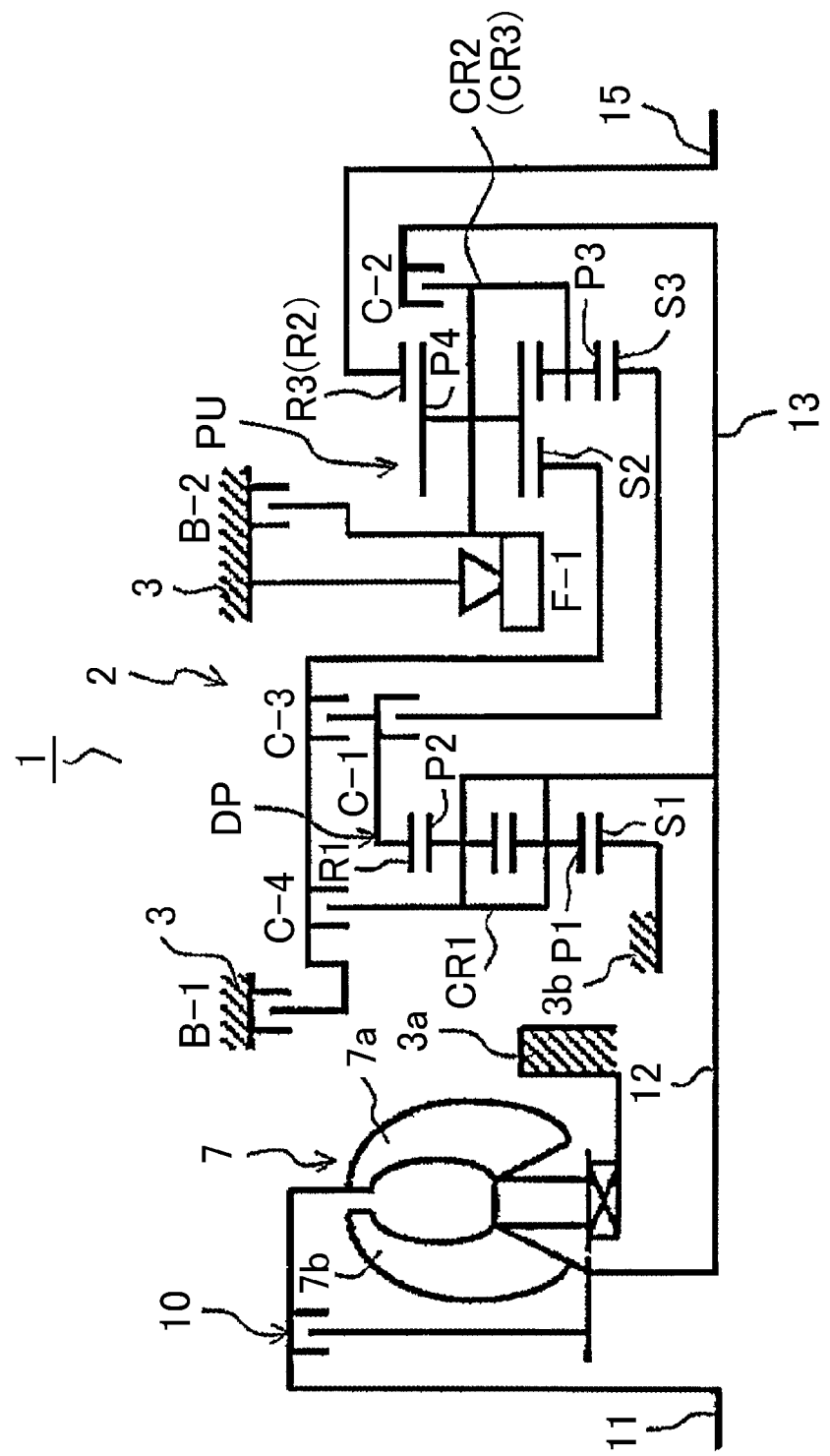
FIG. 1 is a skeleton diagram showing an automatic transmission to which the present invention can be applied.

First, a schematic structure of a multi-stage automatic transmission (hereinafter simply referred to as an "automatic transmission") to which the present invention can be applied will be described with reference to FIG. 1. As shown in FIG. 1, an automatic transmission 1, which is preferably used in, for example, an FR (front engine, rear drive) type vehicle, has an input shaft 11 of the automatic transmission 1 which connects to an engine (not shown), and includes a torque converter 7 and a speed change mechanism 2, which are disposed about the axial direction of the input shaft 11.

The torque converter 7 has a pump impeller 7a which is connected to the input shaft 11 of the automatic transmission 1, and a turbine runner 7b to which rotation of the pump impeller 7a is transmitted via a working fluid. The turbine runner 7b is connected to an input shaft 12 of the speed change mechanism 2 disposed coaxially with the input shaft 11. Moreover, the torque converter 7 includes a lock-up clutch 10, and when the lock-up clutch 10 is engaged by hydraulic control of a hydraulic control device described below, rotation of the input shaft 11 of the automatic transmission 1 is directly transmitted to the input shaft 12 of the speed change mechanism 2.

The speed change mechanism 2 includes a planetary gear DP and a planetary gear unit PU provided on the input shaft 12 (and an intermediate shaft 13). The planetary gear DP is a so-called double-pinion planetary gear, which includes a sun gear S1, a carrier CR1, and a ring gear R1, and which has a pinion P1 meshing with the sun gear S1 and a pinion P2 meshing with the ring gear R1 in an intermeshing state on the carrier CR1.

The planetary gear unit PU is a so-called Ravigneaux type planetary gear which has a sun gear S2, a sun gear S3, a carrier CR2 (CR3), and a ring gear R3 (R2) as four rotary elements, and which has a long pinion P4 meshing with the sun gear S2 and the ring gear R3, and a short pinion P3 meshing with the long pinion P4 and the sun gear S3, in an intermeshing state on the carrier CR2.

The sun gear S1 of the planetary gear DP is connected to, for example, a boss portion 3b which extends from an oil pump body 3a integrally fixed to a mission case 3, so that the rotation of the sun gear S1 is fixed. Moreover, the carrier CR1 is connected to the input shaft 12 to rotate together with the rotation of the input shaft 12 (below, referred to as "input rotation"), and is connected to a fourth clutch C-4 (a friction engagement element). Furthermore, the ring gear R1 provides reduced rotation in which the input rotation is reduced, due to the fixed sun gear S1 and the carrier CR1 which provides the input rotation, and is connected to a first clutch C-1 (a friction engagement element) and a third clutch C-3 (a friction engagement element).

The sun gear S2 of the planetary gear unit PU is connected to a first brake B-1 (a friction engagement element), which serves as a latching unit, so as to be fixable to the mission case 3. The sun gear S2 of the planetary gear unit PU is also connected to the fourth clutch C-4 and the third clutch C-3 so that the input rotation of the carrier CR1 and the reduced rotation of the ring gear R1 are input to the sun gear S2 through the fourth clutch C-4 and the third clutch C-3, respectively. Moreover, the sun gear S3 is connected to the first clutch C-1 so that the reduced rotation of the ring gear G1 is input to the sun gear S3.

In addition, the carrier CR2 is connected to a second clutch C-2 (a friction engagement element) to which the rotation of the input shaft 12 is input via the intermediate shaft 13, so that the input rotation is input to the carrier CR2 via the second clutch C-2. Moreover, the carrier CR2 is connected to a one-way clutch F-1 and a second brake B-2 (a friction engagement element), which serve as a latching unit, so that the rotation in one direction with respect to the mission case 3 is restricted via the one-way clutch F-1, and the rotation is fixable via the second brake B-2. Moreover, the ring gear R3 is connected to an output shaft 15 that outputs rotation to driving wheels (not shown).

[Transmission Path of Each Shift Speed]

Figure 3:
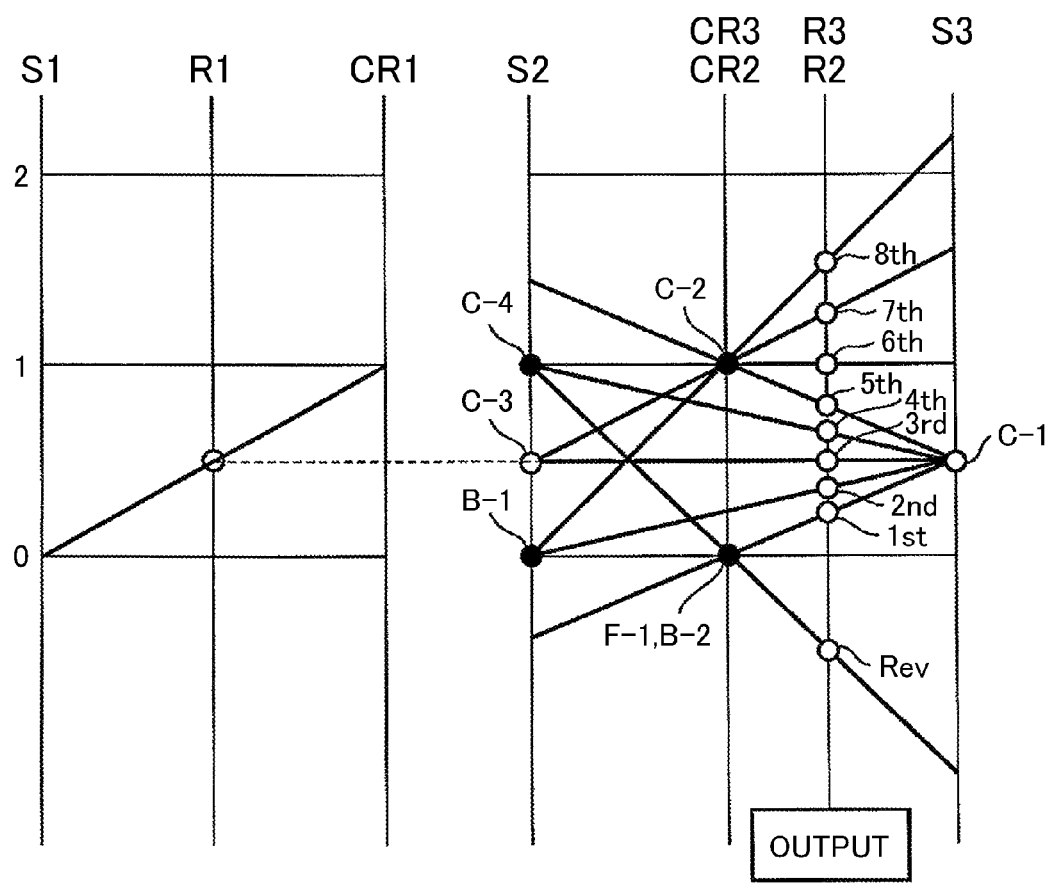
FIG. 3 is a velocity diagram of the automatic transmission.

Next, based on the above structure, operation of the speed change mechanism 2 will be described with reference to FIGS. 1, 2, and 3. Note that FIG. 2 is an operation table of this automatic transmission, where ◯ indicates ON (engaged, latched), and (◯) indicates ON (latched) during engine braking. Moreover, in the velocity diagram shown in FIG. 3, the vertical axes show the rotation speed of each rotary element (each gear), and the horizontal axes show the correspondence with the gear ratios of these rotary elements. In addition, in the part of the velocity diagram showing the planetary gear DP, the endmost vertical axis in the lateral direction (the left side in FIG. 3) corresponds to the sun gear S1, and other vertical axes respectively correspond to the ring gear R1 and the carrier CR1 sequentially to the right in the diagram. Furthermore, in the part of the velocity diagram showing the planetary gear unit PU, the endmost vertical axis in the lateral direction (the right side in FIG. 3) corresponds to the sun gear S3, and other vertical axes respectively correspond to the ring gear R3 (R2), the carrier CR2 (CR3), and the sun gear S2 sequentially to the left in the diagram.

In the D (drive) range, for example, at the first forward speed (1ST), as shown in FIG. 2, the first clutch C-1 and the one-way clutch F-1 are engaged. Thus, as shown in FIGS. 1 and 3, the rotation of the ring gear R1 reduced by the fixed sun gear S1 and by the carrier CR1, which makes the input rotation, is input to the sun gear S3 via the first clutch C-1. Moreover, the rotation of the carrier CR2 is restricted to one direction (the forward rotation direction). That is, the rotation of the carrier CR2 is fixed by preventing the reverse rotation of the carrier CR2. Thus, the reduced rotation, which has been input to the sun gear S3, is output to the ring gear R3 via the fixed carrier CR2, and forward rotation is output from the output shaft 15 as the first forward speed.

Note that, during engine braking (during coasting), the carrier CR2 is fixed by latching the second brake B-2 and thus, the forward rotation of the carrier CR2 is prevented, whereby the state of the first forward speed is maintained. Moreover, at the first forward speed, the one-way clutch F-1 prevents the reverse rotation of the carrier CR2, and allows the forward rotation of the carrier CR2. Thus, for example, the first forward speed can be smoothly established by automatic engagement of the one-way clutch F-1 when a non-travel range is switched to a travel range.

At the second forward speed (2ND), as shown in FIG. 2, the first clutch C-1 is engaged, and the first brake B-1 is latched. Thus, as shown in FIGS. 1 and 3, the rotation of the ring gear R1 reduced by the fixed sun gear S1 and by the carrier CR1, which makes the input rotation, is input to the sun gear S3 via the first clutch C-1. Moreover, the rotation of the sun gear S2 is fixed by the latching of the first brake B-1. Thus, the carrier CR2 makes reduced rotation that is lower than the rotation of the sun gear S3, and the reduced rotation, which has been input to the sun gear S3, is then output to the ring gear R3 via the carrier CR2, and the forward rotation is output from the output shaft 15 as the second forward speed.

At the third forward speed (3RD), as shown in FIG. 2, the first clutch C-1 and the third clutch C-3 are engaged. Thus, as shown in FIGS. 1 and 3, the rotation of the ring gear R1 reduced by the fixed sun gear S1 and by the carrier CR1, which makes the input rotation, is input to the sun gear S3 via the first clutch C-1. Moreover, the reduced rotation of the ring gear R1 is input to the sun gear S2 by the engagement of the third clutch C-3. That is, because the reduced rotation of the ring gear R1 is input to the sun gear S2 and the sun gear S3, the planetary gear unit PU becomes directly coupled to the reduced rotation, and the reduced rotation is directly output to the ring gear R3, whereby the forward rotation is output from the output shaft 15 as the third forward speed.

At the fourth forward speed (4TH), as shown in FIG. 2, the first clutch C-1 and the fourth clutch C-4 are engaged. Thus, as shown in FIGS. 1 and 3, the rotation of the ring gear R1 reduced by the fixed sun gear S1 and by the carrier CR1, which makes the input rotation, is input to the sun gear S3 via the first clutch C-1. Moreover, the input rotation of the carrier CR1 is input to the sun gear S2 by the engagement of the fourth clutch C-4. Thus, the carrier CR2 makes reduced rotation that is higher than the rotation of the sun gear S3, and the reduced rotation, which has been input to the sun gear S3, is output to the ring gear R3 via the carrier CR2, whereby the forward rotation is output from the output shaft 15 as the fourth forward speed.

At the fifth forward speed (5TH), as shown in FIG. 2, the first clutch C-1 and the second clutch C-2 are engaged. Thus, as shown in FIGS. 1 and 3, the rotation of the ring gear R1 reduced by the fixed sun gear S1 and by the carrier CR1, which makes the input rotation, is input to the sun gear S3 via the first clutch C-1. Moreover, the input rotation is input to the carrier CR2 by the engagement of the second clutch C-2. Thus, rotation, which is reduced but higher than the rotation of the fourth forward speed due to the reduced rotation which has been input to the sun gear S3 and the input rotation which has been input to the carrier CR2 is output to the ring gear R3, whereby the forward rotation is output from the output shaft 15 as the fifth forward speed.

At the sixth forward speed (6TH), as shown in FIG. 2, the second clutch C-2 and the fourth clutch C-4 are engaged. Thus, as shown in FIGS. 1 and 3, the input rotation of the carrier CR1 is input to the sun gear S2 by the engagement of the fourth clutch C-4. Moreover, the input rotation is input to the carrier CR2 by the engagement of the second clutch C-2. That is, because the input rotation is input to the sun gear S2 and the carrier CR2, the planetary gear unit PU is directly coupled to the input rotation, and the input rotation is directly output to the ring gear R3, whereby the forward rotation is output from the output shaft 15 as the sixth forward speed (the directly coupled speed).

In the seventh forward speed (7TH), as shown in FIG. 2, the second clutch C-2 and the third clutch C-3 are engaged. Thus, as shown in FIGS. 1 and 3, the rotation of the ring gear R1 reduced by the fixed sun gear S1 and by the carrier CR1, which makes the input rotation, is input to the sun gear S2 via the third clutch C-3. Moreover, the input rotation is input to the carrier CR2 by the engagement of the second clutch C-2. Thus rotation, which is increased to be slightly higher than the input rotation due to the reduced rotation which has been input to the sun gear S2 and the input rotation which has been input to the carrier CR2 is output to the ring gear R3, and the forward rotation is output from the output shaft 15 as the seventh forward speed (the first overdrive speed, which is faster than the directly coupled speed).

At the eighth forward speed (8TH), as shown in FIG. 2, the second clutch C-2 is engaged, and the first brake B-1 is latched. Thus, as shown in FIGS. 1 and 3, the input rotation is input to the carrier CR2 by the engagement of the second clutch C-2. Moreover, the rotation of the sun gear S2 is fixed by the latching of the first brake B-1. Thus, by the fixed sun gear S2, the input rotation of the carrier CR2 is increased to be higher than the rotation of the seventh forward speed, and this increased rotation is output to the ring gear R3, whereby the forward rotation is output from the output shaft 15 as the eighth forward speed (the second overdrive speed which is faster than the directly coupled speed.

At the reverse speed (REV), as shown in FIG. 2, the fourth clutch C-4 is engaged, and the second brake B-2 is latched. Thus, as shown in FIGS. 1 and 3, the input rotation of the carrier CR1 is input to the sun gear S2 by the engagement of the fourth clutch C-4. Moreover, the rotation of the carrier CR2 is fixed by the latching of the second brake B-2. Thus, the input rotation, which has been input to the sun gear S2, is output to the ring gear R3 via the fixed carrier CR2, and the reverse rotation is output from the output shaft 15 as the reverse speed.

Note that, in the present automatic transmission, the reverse speed is established by engaging the fourth clutch C-4 and the second brake B-2 in the reverse range by the hydraulic control executed by the hydraulic control device 20 which will be described in detail below. However, the reverse speed may be established by engaging the third clutch C-3 and the second brake B-2. Alternatively, both of the above reverse speeds may be established to achieve two reverse speeds.

Moreover, for example, in the P (parking) range and the N (neutral) range, the first clutch C-1, the second clutch C-2, the third clutch C-3, and the fourth clutch C-4 are released. Thus, the carrier CR1 and the sun gear S2 are disengaged from each other, and the ring gear R1 is disengaged from the sun gear S2 and the sun gear S3. That is, the planetary gear DP and the planetary gear unit PU are disengaged from each other. Moreover, the input shaft 12 (the intermediate shaft 13) and the carrier CR2 are disengaged from each other. This disconnects power transmission between the input shaft 12 and the planetary gear unit PU. That is, power transmission between the input shaft 12 and the output shaft 15 is disconnected.

[Overall Structure of Hydraulic Control Device]

Next, the hydraulic control device 20 of the automatic transmission according to the present invention will be described with reference to FIG. 4. Note that, in the present embodiment, there is actually one spool in each valve. However, in order to explain the position to switch or control the spool position, the state shown in the right half of the valve in FIG. 4 will be herein referred to as the "right-half position," and the state shown in the left half of the valve in FIG. 4 is referred to as the "left-half position."

The hydraulic control device 20 includes a strainer, an oil pump, a primary regulator valve, a secondary regulator valve, a solenoid modulator valve, a linear solenoid valve SLT, and the like, which are not shown, in order to regulate and generate a hydraulic pressure based on which various primary pressures are generated. Note that, in the present embodiment, the oil pump and the primary regulator valve are collectively shown as a line-pressure generation source (primary-pressure generation source) 5 that generates a line pressure $P_L$ (see FIG. 4).

Figure 4:
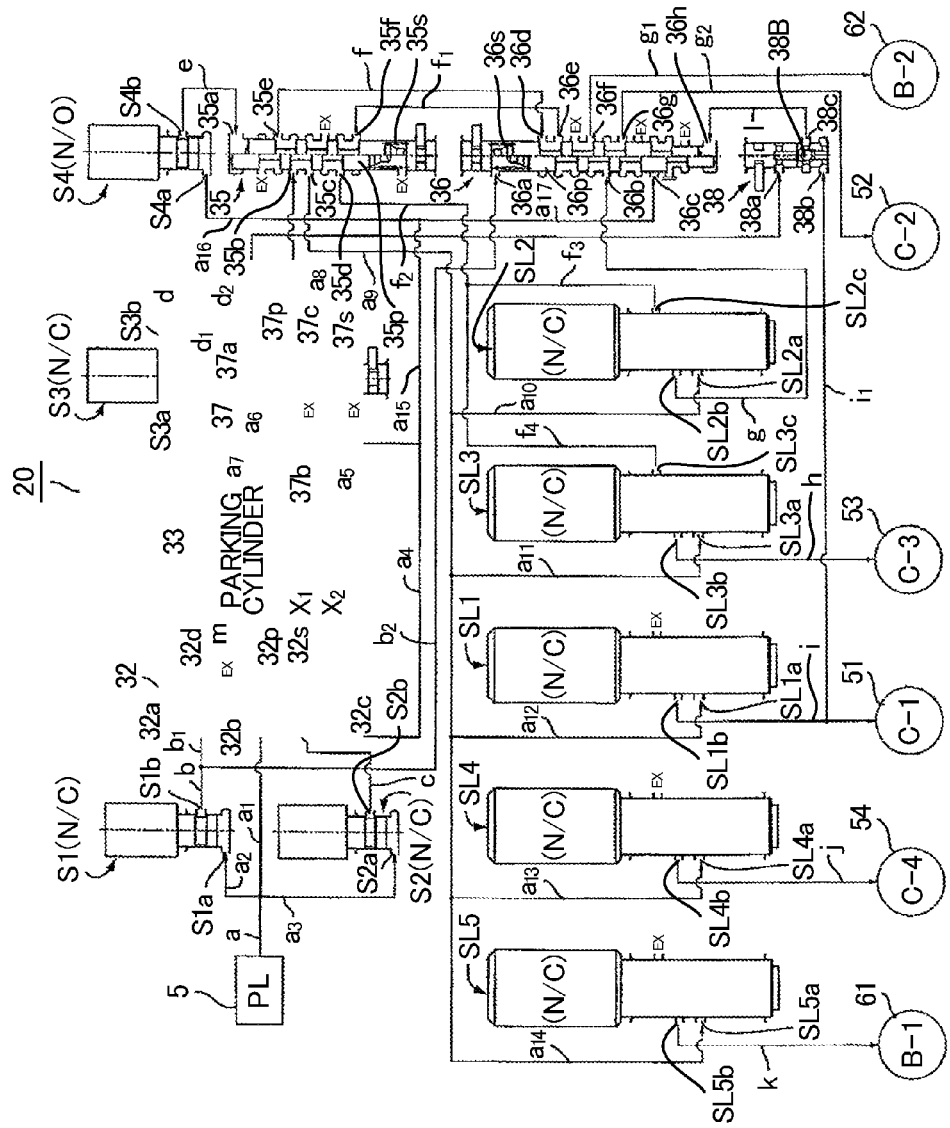
FIG. 4 is a schematic diagram showing a hydraulic control device according to the present invention.

As shown in FIG. 4, the hydraulic control device 20 further includes a linear solenoid valve SL1, a linear solenoid valve SL2, a linear solenoid valve SL3, a linear solenoid valve SL4, a linear solenoid valve SL5, a first solenoid valve S1, a second solenoid valve S2, a third solenoid valve S3, and a fourth solenoid valve S4, in order to electrically control and supply a hydraulic pressure. The hydraulic control device 20 further includes a parking switch valve 32, a parking cylinder 33, a primary-pressure switch valve 35, a distribution switch valve 36, a primary-pressure cutoff switch valve 37, and a check ball valve 38.

Note that so-called normally closed (N/C) type solenoid valves, each of which disconnects between an input port and an output port when the solenoid value is de-energized (this condition will be hereinafter sometimes referred to as being "off"), and communicates the input port with the output port when the solenoid valve is energized (this condition will be hereinafter referred to as being "on"), are used as the solenoid valves other than the fourth solenoid valve S4 in the hydraulic control device 20, that is, the linear solenoid valves SL1 to SL5, and the first and second solenoid valves S1, S2 and the third solenoid valve S3. On the other hand, a normally open (N/O) type solenoid valve is used only as the fourth solenoid valve S4.

Moreover, the hydraulic control device 20 includes a hydraulic servo 51 which can engage and disengage the first clutch C-1, a hydraulic servo 52 which can engage and disengage the second clutch C-2, a hydraulic servo 53 which can engage and disengage the third clutch C-3, a hydraulic servo 54 which can engage and disengage the fourth clutch C-4, a hydraulic servo 61 which can engage and disengage the first brake B-1, and a hydraulic servo 62 which can engage and disengage the second brake B-2, based on the engagement pressures which are regulated and supplied by the linear solenoid valves SL1 to SL5, respectively.

Next, the portions in the hydraulic control device 20 that generates various primary pressures, that is, a line pressure, a secondary pressure, and a modulator pressure, will be described. Note that, since the portions that generate the line pressure, the secondary pressure, and the modulator pressure are similar to those of a common hydraulic control device for an automatic transmission and are well-known in the art, description thereof will be briefly given.

The oil pump (not shown) is connected to, and is rotated by, for example, the pump impeller 7a of the torque converter 7. The oil pump is driven by rotation of the engine, and generates a hydraulic pressure by pumping up oil from the oil pan (not shown) through the strainer (not shown). Moreover, the hydraulic control device 20 includes the linear solenoid valve SLT (not shown), and this linear solenoid valve SLT regulates and outputs a signal pressure according to the throttle opening degree by using a modulator pressure regulated by the solenoid modulator valve (not shown) as a primary pressure.

The primary regulator valve (not shown) regulates the hydraulic pressure generated by the oil pump to a line pressure $P_L$ by partially discharging the hydraulic pressure based on a signal pressure of the linear solenoid valve SLT, which is input to a spool to which the biasing force of a spring thereof is applied. This line pressure $P_L$ is supplied to the various valves described above.

The secondary regulator valve (not shown) further regulates the hydraulic pressure, which has been discharged by the primary regulator valve, to a secondary pressure by partially discharging the hydraulic pressure based on the signal pressure of the linear solenoid valve SLT, which is input to a spool to which the biasing force of a spring thereof is applied. This secondary pressure is supplied to a lubricating oil passage (not shown) and the like, and is also supplied to a lock-up relay valve (not shown) and used as a primary pressure for controlling the lock-up clutch 10. The solenoid modulator valve (not shown) regulates the line pressure $P_L$, which has been regulated by the primary regulator valve, to a modulator pressure which becomes substantially constant when the line pressure $P_L$ is equal to or higher than a prescribed pressure, based on the biasing force of a spring thereof. This modulator pressure is supplied as a primary pressure to the linear solenoid valve SLT (not shown) described above.

[Detailed Structure of Hydraulic Control Device]

As shown in FIG. 4, the first and second solenoid valves (ON/OFF solenoids) S1, S2 (a first system solenoid valve and a range setting solenoid valve, respectively) of the normally closed (N/C) type are structured to receive the line pressure $P_L$ (primary pressure) at an input port S1a through oil passages a and a2 and at an input port S2a through the oil passage a and an oil passage a3, and to output signal pressures $P_{S1}$, $P_{S2}$ from output ports S1b, S2b to first and second hydraulic-fluid chambers 32a, 32c of the parking switch valve 32 through oil passages b, b1 and an oil passage c, respectively, when the valves are energized (turned "on"). The signal pressure $P_{S1}$ from the output port S1b is input also to a first hydraulic-fluid chamber 36a of the distribution switch valve 36, which will be described below, through oil passages b, b2. Moreover, the line pressure $P_L$ is input also to an input port 32b of the parking switch valve 32 through oil passages a, a1, and to an input port 37b of the primary-pressure cutoff switch valve 37, which will be described below, through oil passages a, a1, a4, a5. The line pressure $P_L$ is input also to an input port S4a of the fourth solenoid valve S4 through oil passages a, a1, a4, a15, a16, and to an input oil chamber 36c of the distribution switch valve 36, which will be described below, through oil passages a, a1, a4, a15, a17. Note that the first, second, third, and fourth solenoid valves S1, S2, S3, S4 and their respective signal pressures are described by using the same reference numerals S1, S2, S3, S4, as described above. Moreover, the linear solenoid valves SL1 to SL5 and their respective engagement pressures are also described by using the same reference numerals SL1 to SL5. The same applies to other valves.

The parking switch valve 32 has a spool 32p, and a spring 32s that is provided in a compressed state on one end of the spool 32p, and that biases the spool 32p toward an $X_1$ direction (upward in the drawing). Moreover, the parking switch valve 32 has the first hydraulic-fluid chamber 32a which is provided at the other end of the spool 32p (on the side shown by the arrow $X_1$), and to which the signal pressure $P_{S1}$ from the output port S1*b* of the first solenoid valve S1 is applied, and the second hydraulic-fluid chamber 32*c* which is provided at the one end of the spool 32*p* (on the side shown by the arrow $X_2$), and to which the signal pressure $P_{S2}$ from the output port S2*b* of the second solenoid valve S2 is applied.

Moreover, the parking switch valve 32 has an exhaust port EX, the input port 32*b* to which the line pressure $P_L$ is supplied, and an output port 32*d* which communicates with, or is disconnected from, the input port 32*b* according to the movement of the spool 32*p*. The output port 32*d* communicates with the parking cylinder 33 of a parking device through an oil passage m. The spool 32*p* has a large-diameter land portion located on the lower side of the drawing, and a small-diameter land portion located on the upper side of the drawing. A neck portion is formed and an oil chamber is formed between the large-diameter land portion and the small-diameter land portion. When the spool 32*p* moves downward to the right-half position against the biasing force of the spring 32*s*, and the line pressure $P_L$ received from the input port 32*b* is applied to the neck portion, the spool 32*p* is biased and locked by a force larger than the biasing force of the spring 32*s* in the opposite direction to the biasing direction of the spring 32*s*, that is, in the direction shown by the arrow $X_2$, due to the difference in outer diameter between the large-diameter land portion and the small-diameter land portion, that is, the difference in pressure-receiving area between the large-diameter land portion and the small-diameter land portion.

Referring now to FIG. 6, a parking device 9, which is operated by the parking cylinder 33, will be described below. As shown in FIG. 6, the parking device 9 includes the parking cylinder 33, a parking rod 23, a support 16, a parking pole 17, and a parking gear 21. The parking cylinder 33 is connected to a valve body 22, and a base end of the parking rod 23 extends through the parking cylinder 33 so that the parking rod 23 is movable in the axial direction. A conical wedge 24 is fitted on a tip end of the parking rod 23 with play therebetween so that the conical wedge 24 is movable in the axial direction. A spring 15 is provided between a flange portion 14 fixed to a case (not shown) and the wedge 24. The support 16 is provided under the tip end of the parking rod 23 so that the wedge 24 is inserted and removed from between the support 16 and the parking pole 17. The parking pole 17 is provided so as to be swingable in the substantially vertical direction about a shaft 18 provided on a base end of the parking pole 17. A claw portion 19, which can engage with and disengage from the parking gear 21 fixed to the output shaft (not shown) of the automatic transmission, is provided in a protruding manner on the upper side of an intermediate portion of the parking pole 17.

The parking cylinder 33 is structured as follows: when the hydraulic pressure is applied from the output port 32*d* of the parking switch valve 32 to the parking cylinder 33, the parking rod 23 moves toward the parking cylinder 33 against the biasing force of the spring 15, thereby removing the wedge 24 from between the support 16 and the parking pole 17. Thus, the parking pole 17 swings downward so that the claw portion 19 is disengaged from the parking gear 21, whereby a parking release state is established. Moreover, when the hydraulic pressure from the parking switch valve 32 is cut off, and the hydraulic pressure applied to the parking cylinder 33 is drained, the parking rod 23 moves toward the parking pole 17 by the biasing force of the spring 15, and the wedge 24 is inserted between the support 16 and the parking pole 17. Thus, the parking pole 17 swings upward so that the claw portion 19 meshes with the parking gear 21, whereby a parking state is established.

Moreover, as shown in FIG. 4, in the state where no signal pressure $P_{S1}$ is applied from the output port S1*b* of the first solenoid valve S1 to the first hydraulic-fluid chamber 32*a*, the spool 32*p* of the parking switch valve 32 moves upward in the drawing to the left-half position by the biasing force of the spring 32*s*, thereby cutting off output from the output port 32*d* to the parking cylinder 33. Moreover, in the state where no signal pressure $P_{S2}$ is applied from the output port S2*b* of the second solenoid valve S2 to the second hydraulic-fluid chamber 32*c*, but the signal pressure $P_{S1}$ is input from the output port S1*b* of the first solenoid valve S1 to the first hydraulic-fluid chamber 32*a*, or in the state where no signal pressure $P_{S2}$ is applied to the second hydraulic-fluid chamber 32*c*, but the line pressure $P_L$ is continuously applied to the input port 32*b*, the spool 32*p* moves downward in the drawing to the right-half position, and the hydraulic pressure is supplied from the output port 32*b* to the parking cylinder 33.

On the other hand, the third solenoid valve (ON/OFF solenoid) S3 (a second system solenoid valve) of the normally closed type receives the line pressure $P_L$ at an input port S3*a* through an oil passage a7. The third solenoid valve S3 is structured so that, when being energized ("on" state), the third solenoid valve S3 outputs the line pressure $P_L$ as a signal pressure $P_{S3}$ from an output port S3*b* to a hydraulic-fluid chamber 37*a* of the primary-pressure cutoff switch valve 37 through oil passages d, d1, and when being de-energized ("off" state), the third solenoid valve S3 cuts off the signal pressure $P_{S3}$. Note that the signal pressure $P_{S3}$ from the third solenoid valve S3 can be output also to an input port 38*a* of the check ball valve 38, which will be described below, through oil passages d, d2.

The primary-pressure cutoff switch valve (a second system switch valve) 37 is interposed between oil passages a6, a8 that supplies the line pressure $P_L$ from the line-pressure generation source 5 to the primary-pressure switch valve 35, which will be described below. The primary-pressure cutoff switch valve 37 has the hydraulic-fluid chamber 37*a* which receives the signal pressure $P_{S3}$ through the oil passage d1, the input port 37*b* that receives the line pressure $P_L$ through the oil passage a6, an output port 37*c* that outputs the line pressure $P_L$ of the input port 37*b* to the oil passage a8 when the primary-pressure cutoff switch valve 37 is located at the left-half position, a spool 37*p*, and a spring 37*s* that biases the spool 37*p* upward in the drawing. The spool 37*p* moves downward in the drawing to the right-half position when the signal pressure $P_{S3}$ is input to the hydraulic-fluid chamber 37*a*. Otherwise, the spool 37*p* moves upward in the drawing to the left-half position by the biasing force of the spring 37*s*.

The fourth solenoid valve (ON/OFF solenoid valve) S4 (a first system solenoid valve, a fail solenoid valve) of the normally open type receives the line pressure $P_L$ at the input port S4*a* through the oil passage a16. The fourth solenoid valve S4 is structured so that, when being de-energized ("off" state), the fourth solenoid valve S4 outputs the line pressure $P_L$ as a signal pressure (fail signal pressure) $P_{S4}$ from an output port S4*b* to a hydraulic-fluid chamber 35*a* of the primary-pressure switch valve 35 through an oil passages e, and when being energized ("on" state), the fourth solenoid valve S4 cuts off the signal pressure $P_{S4}$.

The primary-pressure switch valve 35 has: the hydraulic-fluid chamber 35*a*; an input port 35*b* connected to the output port 37*c* of the primary-pressure cutoff switch valve 37 through the oil passage a8; an output port 35*c* connected to input ports SL1*a* to SL5*a* of the linear solenoid valves SL1 to SL5, which will be described below in detail, through an oil passage a9; an output port 35*d* connected to exhaust ports SL2*c*, SL3*c* of the linear solenoid valves SL2, SL3, which will be described below, through an oil passage f2; an output port 35e connected to an input port 36d of the distribution switch valve 36, which will be described below, through an oil passage f; an input port 35f connected to an output port 36e of the distribution switch valve 36, which will be described below, through an oil passage f1; an exhaust port EX; a spool 35p; and a spring 35s that biases the spool 35p upward in the drawing. The spool 35p moves downward in the drawing to the right-half position (a reverse input position) when the signal pressure $P_{S4}$ is input to the hydraulic-fluid chamber 35a, and otherwise, the spool 35p moves upward in the drawing to the left-half position by the biasing force of the spring 35s.

The distribution switch valve 36 has: the first hydraulic-fluid chamber (an unlock-pressure input oil chamber) 36a that receives the signal pressure $P_{S1}$, which is output from the output port S1b of the first solenoid valve S1, through the oil passage b2 in a branching manner; an input port 36b that receives an engagement pressure output from an output port SL2b of the linear solenoid valve SL2; an input oil chamber (a lock-pressure input oil chamber) 36c that receives the line pressure $P_L$ (a lock pressure) through an oil passage a17; the input port 36d that receives a hydraulic pressure, which is output from the output port 35e of the primary-pressure switch valve 35, through the oil passage f when an all-solenoids-off failure occurs; the output port 36e that outputs the hydraulic pressure, which is applied from the output port 35e to the input port 36d, to the input port 35f through the oil passage f1 when the spool 36p is located at the right-half position; an output port 36f that outputs an engagement pressure $P_{SL2}$, which is applied from the linear solenoid valve SL2 to the input port 36b, to the hydraulic servo 62 through an oil passage g1 when the spool 36p is located at the left-half position; an output port 36g that outputs the engagement pressure $P_{SL2}$ to the hydraulic servo 52 through an oil passage g2 when the spool 36p is located at the right-half position; a second hydraulic-fluid chamber (a forward-travel engagement-pressure input oil chamber) 36h that receives, through the check ball valve 38 and an oil passage 1, an engagement pressure $P_{SL1}$ input from an output port SL1b of the linear solenoid valve SL1 through an oil passage i1, or the signal pressure $P_{S3}$ input from the output port S3b of the third solenoid valve S3 through the oil passage d2; a spool 36p; and a spring (biasing unit) 36s that biases the spool 36p downward in the drawing.

The spool 36p of the distribution switch valve 36 moves upward in the drawing to the right-half position (a second position) when the engagement pressure $P_{SL1}$ from the output port SL1b or the signal pressure $P_{S3}$ from the output port S3b is input to the second hydraulic-fluid chamber 36h in the state where no signal pressure $P_{S1}$ is applied from the output port S1b to the first hydraulic-fluid chamber 36a. The spool 36p of the distribution switch valve 36 has a small-diameter land portion and a large-diameter land portion. The small-diameter land portion is formed in the lowermost part of the spool 36p in the drawing, and the large-diameter land portion is formed directly above the small-diameter land portion with a neck portion interposed therebetween. The distribution switch valve 36 is structured so that the line pressure $P_L$ can be input from the input oil chamber 36c to an oil chamber formed in a part of the neck portion. Thus, when the spool 36p of the distribution switch valve 36 moves upward to the right-half position against the biasing force of the spring 36s, the line pressure $P_L$ is input from the input oil chamber 36c to the oil chamber, and the spool 36p is biased and locked by a force larger than the biasing force of the spring 36s in the opposite direction to the biasing direction of the spring 36s, that is, in the upward direction in the drawing, based on the difference in pressure-receiving area between the upper large-diameter land portion and the lower small-diameter land portion. When the signal pressure $P_{S1}$ is input from the output port S1b to the first hydraulic-fluid chamber 36a in this locked state, the biasing force due to the signal pressure $P_{S1}$ and the biasing force of the spring 36s together overcome the biasing force of the locking, whereby the spool 36p moves downward in the drawing (returns) to the left-half position (a first position).

The check ball valve 38 has: the input port 38a that receives the signal pressure $P_{S3}$ from the output port S3b of the third solenoid valve S3 through the oil passage d2; an input port 38b that receives the engagement pressure $P_{SL1}$ from the output port SL1b of the linear solenoid valve SL1 through the oil passage i1; an output port 38c connected to the second hydraulic-fluid chamber 36h of the distribution switch valve 36 through the oil passage 1; and a check ball 38B interposed between the input port 38a and the input port 38b, and the output port 38c.

The check ball 38B of the check ball valve 38 is structured to be pressed by a larger one of the signal pressure $P_{S3}$ applied to the input port 38a and the engagement pressure $P_{SL1}$ applied to the input port 38b and rolls between the input port 38a and the input port 38b, and the output port 38c. This provides a communication between the input port 38a and the input port 38b, and the output port 38c, that is, the larger one of the signal pressure $P_{S3}$ and the engagement pressure $P_{SL1}$ is output from the output port 38c.

On the other hand, the linear solenoid valve SL1 (a first system solenoid valve, an engagement-pressure control solenoid valve) has: the input port SL1a that receives the line pressure $P_L$ from the output port 35c of the primary-pressure switch valve 35 through oil passages a9, a12 in a normal state; the output port SL1b that regulates and controls the line pressure $P_L$ to output the resultant pressure as the engagement pressure $P_{SL1}$ to the hydraulic servo 51 through an oil passage i when the linear solenoid valve SL1 is energized; and an exhaust port EX that mainly drains an engagement pressure $P_{C1}$ of the hydraulic servo 51.

The linear solenoid valve SL2 (a first system solenoid valve, an engagement-pressure control solenoid valve) has: the input port SL2a that receives the line pressure $P_L$ from the output port 35c of the primary-pressure switch valve 35 through oil passages a9, a10 in a normal state; the output port SL2b that regulates and controls the line pressure $P_L$ to output the resultant pressure to the input port 36b of the distribution switch valve 36 when the linear solenoid valve SL2 is energized; and the exhaust port SL2c in communication with the output port 35d of the primary-pressure switch valve 35 through oil passages f2, f3. When draining the engagement pressure $P_{SL2}$ in a normal state, the linear solenoid valve SL2 outputs the engagement pressure $P_{SL2}$ from the exhaust port SL2c to drain the engagement pressure $P_{SL2}$ from the exhaust port EX through the output port 35d. When an all-solenoids-off failure, which will be described below, occurs, the line pressure $P_L$ is reversely input from the output port 35d to the linear solenoid valve SL2 through the oil passages f2, f3 as a reverse input pressure.

The linear solenoid valve SL3 (a first system solenoid valve, an engagement-pressure control solenoid valve) has: the input port SL3a that receives the line pressure $P_L$ from the output port 35c of the primary-pressure switch valve 35 through oil passages a9, a11 when in a normal state; an output port SL3b that regulates and controls the line pressure $P_L$ to output the resultant pressure to the hydraulic servo 53 through an oil passage h as an engagement pressure $P_{SL3}$ when the linear solenoid valve SL3 is energized; and an exhaust port SL3c in communication with the output port 35d of the primary-pressure switch valve 35 through oil passages f2, f4. When draining the engagement pressure $P_{SL3}$ in a normal state, the linear solenoid valve SL3 outputs the engagement pressure $P_{SL3}$ from the exhaust port SL3c to drain the engagement pressure $P_{SL3}$ from the exhaust port EX through the output port 35d. When the all-solenoids-off failure, which will be described below, occurs, the line pressure $P_L$ is reversely input from the output port 35d to the linear solenoid valve SL3 through the oil passages f2, f4 as a reverse input pressure.

The linear solenoid valve SL4 (a first system solenoid valve, an engagement-pressure control solenoid valve) has: the input port SL4a that receives the line pressure $P_L$ from the output port 35c of the primary-pressure switch valve 35 through oil passages a9, a13 in a normal state; an output port SL4b that regulates and controls the line pressure $P_L$ to output the resultant pressure to the hydraulic servo 54 through an oil passage j as an engagement pressure $P_{SL4}$ when the linear solenoid valve SL4 is energized; and an exhaust port EX that mainly drains an engagement pressure $P_{C4}$ of the hydraulic servo 54.

The linear solenoid valve SL5 (a first system solenoid valve, an engagement-pressure control solenoid valve) has: the input port SL5a that receives the line pressure $P_L$ from the output port 35c of the primary-pressure switch valve 35 through oil passages a9, a14 in a normal state; an output port SL5b that regulates and controls the line pressure $P_L$ to output the resultant pressure to the hydraulic servo 61 through an oil passage k as an engagement pressure $P_{SL5}$ when the linear solenoid valve SL5 is energized; and an exhaust port EX that mainly drains an engagement pressure $P_{B1}$ of the hydraulic servo 61.

Note that, in the present embodiment described above, the path of the oil passages f, f1, f2, f3, f4 forms a reverse-input oil passage which communicates with the linear solenoid valves SL2, SL3 through the distribution switch valve 36.

[Structure of Command System]

Figure 7A:
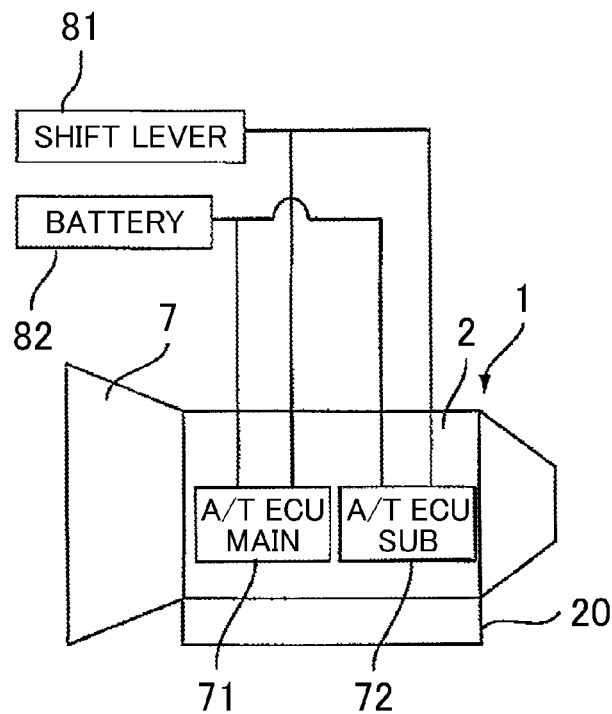
FIG. 7A is a block diagram showing a schematic structure.

An electrical command system, which is a feature of the present invention, will be described with reference to FIGS. 7A and 7B. As shown in FIG. 7A, the automatic transmission 1, which generally includes the automatic speed change mechanism 2, the torque converter 7, and the hydraulic control device 20, is provided with a first computer (A/T ECU main) 71 and a second computer (A/T ECU sub) 72, which are connected to a shift lever (shift range operating unit) 81 provided near a driver's seat (not shown), and a battery 82 set in, for example, an engine room. Note that the shift lever 81, which is provided in the driver's seat of an automobile on which the automatic transmission 1 is mounted, is structured so that the P (parking) range, the R (reverse) range, the N (neutral) range, and the D (drive) range can be selected sequentially in the moving direction of the shift lever 81.

Figure 7B:
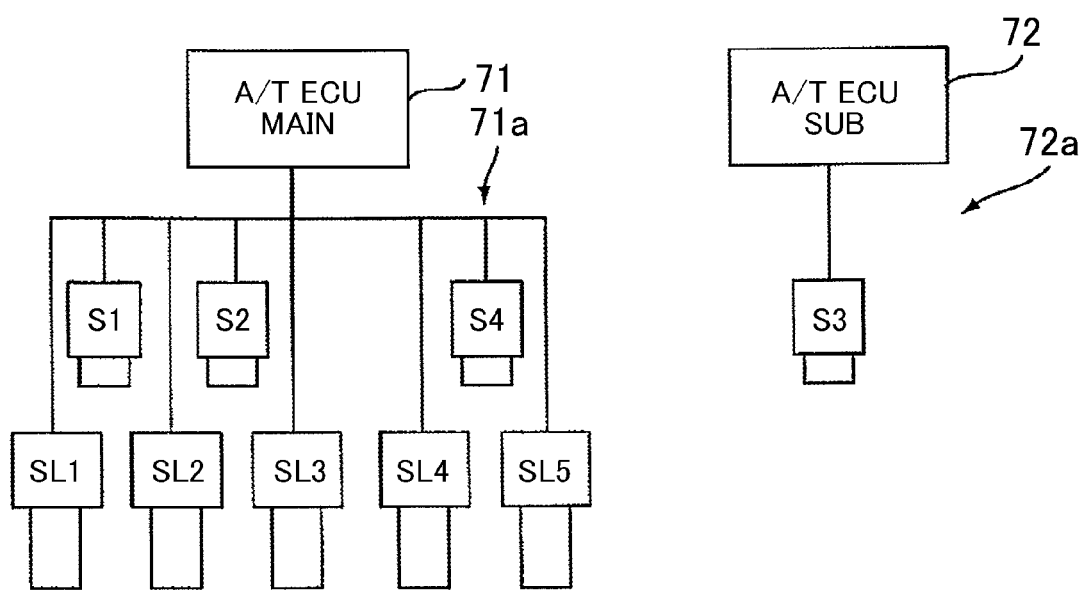
FIG. 7B is a schematic diagram showing command systems.

As shown in FIG. 7B, the first computer 71 is connected to the first, second, and fourth solenoid valves S1, S2, S4 and the linear solenoid valves SL1 to SL5 via wires and the like to form a first command system 71a. The first computer 71 is structured to perform a control operation for generating electric commands of the first command system 71a. In other words, the output state of the hydraulic pressure from the first, second, and fourth solenoid valves S1, S2, S4 and the linear solenoid valves SL1 to SL5 is controlled by the first computer 71 and the first command system 71a. Moreover, the second computer 72 is connected only to the third solenoid valve S3 via wires and the like to form a second command system 72a. The second computer 72 is structured to perform a control operation for generating electric commands of the second command system 72a. In other words, the output state of the hydraulic pressure from the third solenoid valve S3 is controlled by the second computer 72 and the second command system 72a. The first command system 71a and the second command system 72a are formed in separate systems, and are electrically (in terms of wires, signal transmission and reception, and the like) isolated from each other. That is, the first command system 71a and the second command system 72a are structured so that, even when one of the first command system 71 a and the second command system 72a has any problems, the other is not affected by the problems in the one command system.

In other words, as will be described below in detail, the first command system 71a including the first computer 71 is used in a normal state. In a normal state, the first command system 71a performs shift control of the shift range and each shift speed and the like, based on the operation input of the shift lever 81. When the first command system 71a fails due to a failure of the first computer 71 and wire disconnection, coming-off of connectors or the like in the first command system, the second command system of the second computer 72 is driven regardless of the failure of the first command system so that fail-safe control can be executed by using the third solenoid valve S3 based on the selection operation of the shift lever 81.

[Operation in Normal State]

Operation in a normal state of the hydraulic control device 20 described above will now be described with reference to FIGS. 4, 5, and 7. In this hydraulic control device 20, the shift range setting control and the shift control of each shift speed are performed by the first computer 71 and the first command system 71a when the first computer 71 and the first command system 71a are in a normal state.

That is, for example, in the P range (a non-travel range, a parking range) based on the operation of the shift lever 81 by a driver, as shown in FIGS. 4, 5, and 7, an electric command generated by the first computer 71 is transmitted through the first command system 71a (hereinafter referred to as "control of the first computer 71"), whereby the first solenoid valve S1 is turned off, and no signal pressure $P_{S1}$ is output from the output port S1b, while the second and fourth solenoid valves S2, S4 are turned on, and the signal pressure $P_{S2}$ is output from the output port S2b of the second solenoid valve S2. No signal pressure $P_{S4}$ is output from the output port S4b of the fourth solenoid valve S4 of the normally open type.

In this P range state, no signal pressure $S_{S1}$ is applied to the first hydraulic-fluid chamber 32a in the parking switch valve 32, and the signal pressure $P_{S2}$ is applied to the second hydraulic-fluid chamber 32c. Thus, together with the biasing force of the spring 32s, the spool 32p moves to the left-half position, and inputting of the line pressure $P_L$ to the input port 32b is disconnected. Thus, the hydraulic pressure from the parking switch valve 32 to the parking cylinder 33 is cut off, and the parking rod 23 moves toward the parking pole 17 by the biasing force of the spring 15. As a result, the wedge 24 is inserted between the support 16 and the parking pole 17, and the claw portion 19 meshes with the parking gear 21, whereby the parking state is established.

Moreover, the third solenoid valve S3 to which an electric command generated by the second computer 72 is transmitted through the second command system 72a (hereinafter referred to as "control of the second computer 72") is kept in the off state when the first computer 71 and the first command system 71 a are in the normal state, as will be described in detail below. That is, no control is executed for the third solenoid valve S3. Thus, the primary-pressure cutoff switch valve 37 is kept at the left-half position by the biasing force of the spring 37s, whereby the line pressure $P_L$, which has been input to the input port 37b through the oil passage a6, is output from the output port 37c to the input port 35b of the primary-pressure switch valve 35 through the oil passage a8.

Moreover, since the fourth solenoid valve S4 is turned on by the control of the first computer 71, no signal pressure $P_{S4}$ is applied from the output port S4b to the hydraulic-fluid chamber 35a of the primary-pressure switch valve 35, and the spool 35p is located at the left-half position. Thus, the line pressure $P_L$ applied to the input port 35b is output from the output port 35c to all of the linear solenoid valves SL1 to SL5. However, since all of the linear solenoid valves SL1 through SL5 are in the off state, no engagement pressure $P_{SL1}$ to $P_{SL5}$ is output.

Next, when the shift lever 81 is operated to the R range (a reverse travel range, a reverse range), the first solenoid valve S1 is turned on by the control of the first computer 71, and the signal pressure $P_{S1}$ is output from the output port S1b. Thus, since the signal pressure $S_{S1}$ is applied to the first hydraulic-fluid chamber 32a of the parking switch valve 32, the spool 32p moves to the right-half position against the biasing force of the spring 32s, and the input of the line pressure $P_L$ to the input port 32b is output from the output port 32d. Thus, the parking rod 23 moves toward the parking cylinder 33 against the biasing force of the spring 15. As a result, the wedge 24 is removed from between the support 16 and the parking pole 17, and the claw portion 19 is disengaged from the meshing with the parking gear 21, whereby the parking release state is established. Thus, the parking switch valve 32 in which the spool 32p is located at the right-half position is locked to the right-half position due to the difference in pressure-receiving area between the large-diameter land portion and the small-diameter land portion. Note that the first solenoid valve S1, which has been herein turned on, may be turned off after a predetermined time such as about several seconds.

Moreover, as described above, the third solenoid valve S3 is turned off, and the fourth solenoid valve S4 is kept in the on state. Thus, no signal pressure $P_{S3}$ is applied from the output port S3b to the hydraulic-fluid chamber 37a of the primary-pressure cutoff switch valve 37, and the spool 37p is located at the left-half position. Thus, the line pressure $P_L$ applied to the input port 37b is output from the output port 37c to the input port 35b of the primary-pressure switch valve 35. On the other hand, no signal pressure $P_{S4}$ is applied from the output port S4b to the hydraulic-fluid chamber 35a of the primary-pressure switch valve 35, and the spool 35p is located at the left-half position. Thus, the line pressure $P_L$ applied to the input port 35b is output from the output port 35c to all of the linear solenoid valves SL1 to SL5.

Since the linear solenoid valves SL2, SL4 are turned on by the control of the first computer 71, the engagement pressure $P_{SL2}$ is output from the output port SL2b to the input port 36b of the distribution switch valve 36. However, the first solenoid valve S1 is turned on, the signal pressure $P_{S1}$ is output to the first hydraulic-fluid chamber 36a of the distribution switch valve 36, and the spool 36p is located at the left-half position. Thus, the engagement pressure $P_{SL2}$ is supplied from the input port 36b to the hydraulic servo 62 through the output port 36f, whereby the second brake B-2 is latched. At the same time, since the linear solenoid valve SL4 is turned on, the line pressure $P_L$ from the output port 35c of the primary-pressure switch valve 35 is regulated and output as the engagement pressure $P_{SL4}$ from the output port SL4b to the hydraulic servo 54, whereby the fourth clutch C-4 is engaged. Thus, together with the latching of the second brake B-2, a reverse speed is established.

Moreover, when the shift lever 81 is operated to the N range (a non-travel range, a neutral range), the first solenoid valve S1 is turned on, and this locates the parking switch valve 32 at the right-half position, whereby the parking release state is established, as in the case of the R range. Since the third solenoid valve S3 is turned off, and the fourth solenoid valve S4 is turned on, the primary-pressure cutoff switch valve 37 and the primary-pressure switch valve 35 are similarly located at the left-half position, whereby the line pressure $P_L$ is output to all the linear solenoid valves SL1 to SL5. At this time, the linear solenoid valves SL1 to SL5 are turned on by the control of the first computer 71, as in the case of the P range. Thus, no engagement pressure $P_{SL1}$ to $P_{SL5}$ is output, whereby a neutral state is established.

At the first forward speed of the forward travel range in which the shift lever 81 is in the D range (a forward travel range, a drive range) (i.e., upon starting of forward traveling), the first solenoid valve S1 is turned off by the control of the first computer 71, and no signal pressure $S_{S1}$ is output from the output port S1b. However, as described above, the parking switch valve 32 is locked to the right-half position by the difference in pressure-receiving area between the large-diameter land portion and the small-diameter land portion, whereby the parking release state is established.

Similarly, since the third solenoid valve S3 is turned off, and the fourth solenoid valve S4 is turned on, the primary-pressure cutoff switch valve 37 and the primary-pressure switch valve 35 are similarly located at the left-half position, and the line pressure $P_L$ is output to all the linear solenoid valves SL1 to SL5. Since the linear solenoid valve SL1 is turned on, the engagement pressure $P_{SL1}$ is supplied from the output port SL1b to the first clutch C-1, whereby the first clutch C-1 is engaged (that is, the first clutch C-1 is engaged upon starting of forward traveling). Thus, together with latching of the one-way clutch F-1, the first forward speed is established. Note that, at this time, since the engagement pressure $P_{SL1}$ is input to the second hydraulic-fluid chamber 36h of the distribution switch valve 36 through the oil passage i1, the check ball valve 38, and the oil passage 1, the spool 36p of the distribution switch valve 36 is switched to the right-half position.

During engine braking of the first forward speed at which the shift lever 81 is in the D range, the line pressure $P_L$ is output to all the linear solenoid valves SL1 to SL5 as in the case of the first forward speed in the forward travel range. In this state, the linear solenoid valves SL1, SL2 are both turned on. Thus, the linear solenoid valve SL1 supplies the engagement pressure $P_{SL1}$ from the output port SL1b to the hydraulic servo 51 so as to engage the first clutch C-1.

Moreover, the linear solenoid valve SL2 outputs the engagement pressure $P_{SL2}$ from the output port SL2b to the input port 36b of the distribution switch valve 36. At this time, the engagement pressure $P_{SL1}$ is input to the second hydraulic-fluid chamber 36h of the distribution switch valve 36 through the check ball valve 38 as described above. The first solenoid valve S1 is turned on by the control of the first computer 71, and the signal pressure $S_{S1}$ is input from the first solenoid valve S1 to the first hydraulic-fluid chamber 36a of the distribution switch valve 36. This switches the distribution switch valve 36 to the left-half position. As a result, the engagement pressure $P_{SL2}$ is supplied from the input port 36b to the hydraulic servo 62 through the output port 36f, whereby the second brake B-2 is latched. Thus, together with the engagement of the first clutch C-1, engine braking of the first forward speed is established.

At the second forward speed at which the shift lever 81 is in the D range, the first and second solenoid valves S1, S2 are turned off by the control of the first compute 71, and no signal pressure $P_{S1}$, $P_{S2}$ is output from the output ports S1$b$, S2$b$. In this state, the parking switch valve 32 is locked to the right-half position, whereby the parking release state is established, as described above. Similarly, since the third solenoid valve S3 is turned off, and the fourth solenoid valve S4 is turned on, the primary-pressure cutoff switch valve 37 and the primary-pressure switch valve 35 are similarly located at the left-half position, and the line pressure $P_L$ is output to all the linear solenoid valves SL1 to SL5.

Since the linear solenoid valves SL1, SL5 are turned on, the engagement pressure $P_{SL1}$ is supplied from the output port SL1$b$ of the linear solenoid valve SL1 to the hydraulic servo 51 so as to engage the first clutch C-1. Moreover, the engagement pressure $P_{SL5}$ is supplied from the output port SL5$b$ of the linear solenoid valve SL5 to the hydraulic servo 61 so as to latch the first brake B-1. This establishes the second forward speed.

At the third forward speed at which the shift lever 81 is in the D range, the first and second solenoid valves S1, S2 are turned off, and the parking switch valve 32 is locked to the right-half position, whereby the parking release state is established, as described above. Moreover, the third solenoid valve S3 is turned off, and the fourth solenoid valve S4 is turned on, whereby the line pressure $P_L$ is output to all the linear solenoid valves SL1 to SL5.

In this case, since the linear solenoid valves SL1, SL3 are turned on, the engagement pressure $P_{SL1}$ is output from the output port SL1$b$ of the linear solenoid valve SL1 to the hydraulic servo 51 so as to engage the first clutch C-1, and the engagement pressure $P_{SL3}$ is supplied from the output port SL3$b$ of the linear solenoid valve SL3 to the hydraulic servo 53 to latch the third clutch C-3. This establishes the third forward speed.

At the fourth forward speed at which the shift lever 81 is in the D range, the first and second solenoid valves S1, S2 are turned off, and the parking switch valve 32 is locked to the right-half position, whereby the parking release state is established, as described above. Moreover, the third solenoid valve S3 is turned off, and the fourth solenoid valve S4 is turned on, whereby the line pressure $P_L$ is output to all the linear solenoid valves SL1 to SL5.

In this case, since the linear solenoid valves SL1, SL4 are turned on, the engagement pressure $P_{SL1}$ is supplied from the output port SL1$b$ of the linear solenoid valve SL1 to the hydraulic servo 51 to engage the first clutch C-1, and the engagement pressure $P_{SL4}$ is supplied from the output port SL4$b$ of the linear solenoid valve SL4 to the hydraulic servo 54 to latch the fourth clutch C-4. This establishes the fourth forward speed.

At the fifth forward speed at which the shift lever 81 is in the D range, the first and second solenoid valves S1, S2 are turned off, and the parking switch valve 32 is locked to the right-half position, whereby the parking release state is established, as described above. Moreover, the third solenoid valve S3 is turned off, and the fourth solenoid valve S4 is turned on, whereby the line pressure $P_L$ is output to all the linear solenoid valves SL1 to SL5.

In this case, since the linear solenoid valves SL1, SL2 are turned on, the engagement pressure $P_{SL1}$ is supplied from the output port SL1$b$ of the linear solenoid valve SL1 to the hydraulic servo 51 so as to engage the first clutch C-1. Further, the engagement pressure $P_{SL2}$ is output from the output port SL2$b$ of the linear solenoid valve SL2 to the input port 36$b$ of the distribution switch valve 36. At this time, since the engagement pressure $P_{SL1}$ is input to the second hydraulic-fluid chamber 36$h$ of the distribution switch valve 36 through the check ball valve 38, the distribution switch valve 36 is switched to the right-half position, and is locked to the right-half position by a lock pressure (the line pressure $P_L$) applied to the input oil chamber 36$c$. Thus, the engagement pressure $P_{SL2}$ is supplied from the input port 36$b$ through the output port 36$g$ to the hydraulic servo 52, whereby the second clutch C-2 is engaged. Thus, together with the engagement of the first clutch C-1, the fifth forward speed is established.

Moreover, at the sixth forward speed at which the shift lever 81 is in the D range, the first and second solenoid valves S1, S2 are turned off, and the parking switch valve 32 is locked to the right-half position, whereby the parking release state is established, as described above. Moreover, the third solenoid valve S3 is turned off, and the fourth solenoid valve S4 is turned on, whereby the line pressure $P_L$ is output to all the linear solenoid valves SL1 to SL5.

In this case, since the linear solenoid valves SL2, SL4 are turned on, the engagement pressure $P_{SL4}$ is supplied from the output port SL4$b$ of the linear solenoid valve SL4 to the hydraulic servo 54 so as to engage the fourth clutch C-4. Moreover, the engagement pressure $P_{SL2}$ is output from the output port SL2$b$ of the linear solenoid valve SL2 to the input port 36$b$ of the distribution switch valve 36. Since the distribution switch valve 36 is locked to the right-half position as in the case of the fifth forward speed, the engagement pressure $P_{SL2}$ is supplied from the input port 36$b$ through the output port 36$g$ to the hydraulic servo 52, whereby the second clutch C-2 is engaged. Thus, together with the engagement of the fourth clutch C-4, the sixth forward speed is established.

Moreover, at the seventh forward speed at which the shift lever 81 is in the D range, the first and second solenoid valves S1, S2 are turned off, and the parking switch valve 32 is locked to the right-half position, whereby the parking release state is established, as described above. Moreover, the third solenoid valve S3 is turned off, and the fourth solenoid valve S4 is turned on, whereby the line pressure $P_L$ is output to all the linear solenoid valves SL1 to SL5.

In this case, since the linear solenoid valves SL2, SL3 are turned on, the engagement pressure $P_{SL3}$ is supplied from the output port SL3$b$ of the linear solenoid valve SL3 to the hydraulic servo 53 so as to engage the third clutch C-3. Moreover, the engagement pressure $P_{SL2}$ is output from the output port SL2$b$ of the linear solenoid valve SL2 to the input port 36$b$ of the distribution switch valve 36. Since the distribution switch valve 36 is locked to the right-half position as in the case of the fifth and sixth forward speeds, the engagement pressure $P_{SL2}$ is supplied from the input port 36$b$ through the output port 36$g$ to the hydraulic servo 52, whereby the second clutch C-2 is engaged. Thus, together with the engagement of the third clutch C-3, the seventh forward speed is established.

Moreover, at the eighth forward speed at which the shift lever 81 is in the D range, the first and second solenoid valves S1, S2 are turned off, and the parking switch valve 32 is locked to the right-half position, whereby the parking release state is established, as described above. Moreover, the third solenoid valve S3 is turned off, and the fourth solenoid valve S4 is turned on, whereby the line pressure $P_L$ is output to all the linear solenoid valves SL1 to SL5.

In this case, since the linear solenoid valves SL2, SL5 are turned on, the engagement pressure $P_{SL5}$ is supplied from the output port SL5$b$ of the linear solenoid valve SL5 to the hydraulic servo 61 so as to latch the first brake B-1. Moreover, the engagement pressure $P_{SL2}$ is output from the output port SL2$b$ of the linear solenoid valve SL2 to the input port 36$b$ of the distribution switch valve 36. Since the distribution switch valve 36 is locked to the right-half position as in the case of the fifth to seventh forward speeds, the engagement pressure $P_{SL2}$ is supplied from the input port 36*b* through the output port 36*g* to the hydraulic servo 52, whereby the second clutch C-2 is engaged. Together with the latching of the first brake B-1, this establishes the eighth forward speed.

The hydraulic control device 20 of the multi-stage automatic transmission described above include: the first to fourth clutches C-1 to C-4 and the first and second brakes B-1, B-2; the plurality of hydraulic servos 51 to 54, 61, 62 that engage and disengage the first to fourth clutches C-1 to C-4 and the first and second brakes B-1, B-2; the linear solenoid valves SL1 through SL5, the number of which is smaller than the number of hydraulic servos 51 to 54, 61, 62 by one; and the distribution switch valve 36 that distributes the engagement pressure $P_{SL2}$ from at least one (SL2) of the linear solenoid valves SL1 to SL5 to two (52, 62) of the hydraulic servos described above. At least in the reverse (R) range (the reverse travel range), the non-travel ranges (the P range, the N range), and at a specific shift speed in a forward travel range (engine braking of the first forward speed), the distribution switch valve 36 is switched to the left-half position (a first position) at which the distribution switch valve 36 can supply the engagement pressure $P_{SL2}$ to the hydraulic servo 62. In the other forward travel ranges (the first forward speed to the eighth forward speed), the distribution switch valve 36 is switched to the right-half position (a second position) at which the distribution switch valve 36 can supply the engagement pressure $P_{SL2}$ to the hydraulic servo 52.

[Operation in the Case of All-Solenoids-Off Failure]

Next, an all-solenoids-off failure occurring in the first computer 71 and the first command system 71*a* will be described. When the hydraulic control device 20 of this automatic transmission detects a failure due to, for example, a failure of the first computer 71, wire disconnection in the first command system 71*a*, coming-off of connectors in the first command system 71*a*, or the like, the hydraulic control device 20 shifts to an all-solenoids-off fail mode in which the solenoid valves S1, S2, S4 and the linear solenoid valves SL1 to SL5 (see FIG. 7B), which are controlled by the first computer 71 and the first command system 71*a*, are turned off. Note that such a failure detection method may be applied to, for example, the case where the control instructed by the first computer 71 is different from actual operation in the automatic transmission 1 (for example, in the case where an instructed shift speed is different from an actual gear ratio), and the like. Moreover, the hydraulic control device 20 is configured so that occurrence of the all-solenoids-off failure in the first computer 71 and the first command system 71*a* is transmitted to the second computer 72 or detected by the second computer 72. However, the following description will be given on the assumption that the third solenoid valve S3 has been in the off state at the time the all-solenoids-off failure occurs.

For example, if the all-solenoids-off failure in the first computer 71 and the first command system 71*a* (hereinafter referred to as the "all-solenoids-off failure of the first command system 71*a*") occurs when the vehicle is traveling in a forward range, the solenoid valves S1, S2, S4 and the linear solenoid valves SL1 to SL5 are turned off. In this case, the signal pressure $P_{S4}$ is output only from the normally-open type fourth solenoid valve S4, and the other solenoid valves stop outputting the signal pressure or the engagement pressure. Thus, especially in the linear solenoid valves SL2, SL3, the output ports SL2*b*, SL3*b* communicate with the exhaust ports SL2*c*, SL3*c*, respectively.

At this time, the signal pressure $P_{S4}$ of the fourth solenoid valve S4 is applied to the hydraulic-fluid chamber 35*a* of the primary-pressure switch valve 35, and the spool 35*p* overcomes the biasing force of the spring 35*s*, and switches to the right-half position. Thus, the line pressure $P_L$ applied to the input port 35*b*, is output from the output port 35*e* to the oil passage f, and is input to the input port 36*d* of the distribution switch valve 36. At this time, the distribution switch valve 36 has been locked to the right-half position by the line pressure $P_L$ applied to the input oil chamber 36*c*, based on the difference in pressure-receiving area between the large-diameter land portion and the small-diameter land portion, as described above. Thus, the line pressure $P_L$ applied to the input port 36*d* is applied from the output port 36*e* to the input port 35*f* of the primary-pressure switch valve 35 through the oil passage f1, and is applied as a reverse input pressure to the exhaust ports SL2*b*, SL3*c* of the linear solenoid valves SL2, SL3 through the output ports 35*d* and the oil passages f2, f3, f4, respectively.

Thus, the linear solenoid valve SL2, receiving the reverse input pressure from the exhaust port SL2*c*, outputs the reverse input pressure (i.e., the line pressure $P_L$) as the engagement pressure $P_{SL2}$ from the output port SL2*b* to an oil passage g so as to supply the reverse input pressure from the input port 36*b* of the distribution switch valve 36 through the output port 36*g* and the oil passage g2 to the hydraulic servo 52, whereby the second clutch C-2 is engaged. At the same time, the linear solenoid valve SL3, receiving the reverse input pressure from the exhaust port SL3*c*, supplies the reverse input pressure as the engagement pressure $P_{SL3}$ from the output port SL3*b* through the oil passage h to the hydraulic servo 53, whereby the third clutch C-3 is engaged. This engagement of the third clutch C-3, together with the engagement of the second clutch C-2, establishes the seventh forward speed.

As described above, when the all-solenoids-off failure of the first command system 71 a occurs when the vehicle is traveling in a forward range, the seventh forward speed, at which the second clutch C-2 and the third clutch C-3 are engaged, is established.

However, when the all-solenoids-off failure of the first command system 71*a* occurs when the vehicle is traveling in the engine braking operation at the first forward speed, since the first solenoid valve S1 has been in the on state before occurrence of the all-solenoids-off failure of the first command system 71*a*, and this causes the signal pressure $P_{S1}$ to be applied to the first hydraulic-fluid chamber 36*a* of the distribution switch valve 36, the spool 36*p* is already located at the left-half position. Thus, upon occurrence of the all-solenoids-off failure of the first command system 71*a*, even if the line pressure $P_L$ (a fail hydraulic pressure) is applied from the output port 35*e* to the input port 36*d* when the fourth solenoid valve S4 is turned off, the line pressure $P_L$ is cut off, and thus, is not reversely input to the linear solenoid valves SL2, SL3, whereby the N range is established.

On the other hand, for example, if the all-solenoids-off failure of the first command system 71*a* occurs when the vehicle is in the P range, only the normally open type fourth solenoid valve S4 outputs the signal pressure $P_{S4}$, and the line pressure $P_L$ is applied to the input port 36*d* of the distribution switch valve 36 through the input port 35*b* and the output port 35*e* of the primary-pressure switch valve 35. In this case, however, in the P range, the linear solenoid valve SL1 has been turned off before occurrence of the all-solenoids-off failure of the first command system 71*a*. Thus, no engagement pressure $P_{SL1}$ is applied from the output port SL1*b* to the second hydraulic-fluid chamber 36*h*, and the spool 36*p* is located at the left-half position. As a result, the line pressure $P_L$ applied to the input port 36*d* is cut off, and no line pressure $P_L$ is applied to the input port 35*f* of the primary-pressure switch valve 35. Thus, no reverse input pressure is input to the exhaust ports SL2*c*, SL3*c* of the linear solenoid valves SL2, SL3. Moreover, at the time when the all-solenoids-off failure of the first command system 71a occurs, the parking switch valve 32 is already located at the left-half position, and the line pressure $P_L$ to the parking cylinder 33 is already cut off. Thus, a parking state is maintained.

As described above, when the all-solenoids-off failure of the first command system 71a occurs when the vehicle is in the P range, none of the first to fourth clutches C-1 to C-4 and the first and second brakes B-1, B-2 are engaged nor latched, whereby the P range is maintained.

For example, if the all-solenoids-off failure of the first command system 71a occurs when the vehicle is in the R range, only the fourth solenoid valve S4 outputs the signal pressure $P_{S4}$, and the line pressure $P_L$ is applied to the input port 36d of the distribution switch valve 36, as in the case described above. At this time, in the R range as well, the linear solenoid valve SL1 has been turned off before occurrence of the all-solenoids-off failure of the first command system 71a. Thus, the spool 36p is already located at the left-half position, and the line pressure $P_L$ applied to the input port 36d is cut off. Thus, no reverse input pressure is input to the exhaust ports SL2c, SL3c of the linear solenoid valves SL2, SL3. Moreover, since the line pressure $P_L$ is continuously applied to the input port 32b, the spool 32p, which has been locked to the right-half position before occurrence of the all-solenoids-off failure of the first command system 71a, is maintained at the right-half position, whereby the parking release state is maintained.

Thus, when the all-solenoids-off failure of the first command system 71a occurs when the vehicle is in the R range, none of the first to fourth clutches C-1 to C-4 and the first and second brakes B-1, B-2 are engaged nor latched, whereby the shift range shifts to the N range.

For example, if the all-solenoids-off failure of the first command system 71a occurs while the vehicle is in the N range, only the fourth solenoid valve S4 outputs the signal pressure $P_{S4}$, and the line pressure $P_L$ is applied to the input port 36d of the distribution switch valve 36, as in the case described above. At this time, in the N range as well, the linear solenoid valve SL1 has been turned off before occurrence of the all-solenoids-off failure of the first command system 71a. Thus, the spool 36p is already located at the left-half position, and therefore, the line pressure $P_L$ applied to the input port 36d is cut off. Thus, no reverse input pressure is input to the exhaust ports SL2c, SL3c of the linear solenoid valves SL2, SL3. Moreover, since the line pressure $P_L$ is continuously applied to the input port 32b, the spool 32p, which has been locked to the right-half position before occurrence of the all-solenoids-off failure of the first command system 71a, is maintained at the right-half position, whereby the parking release state is maintained.

Thus, when the all-solenoids-off failure of the first command system 71a occurs when the vehicle is in the N range, none of the first to fourth clutches C-1 to C-4 and the first and second brakes B-1, B-2 are engaged nor latched, whereby the N range is maintained.

As described above, even if the all-solenoids-off failure of the first command system 71a occurs at any of the first forward speed to the eighth forward speed except for the engine brake operation at the first forward speed, the forward seventh speed can be established to ensure traveling of the vehicle. Moreover, if the all-solenoids-off failure of the first command system 71a occurs when the vehicle is in the P range, the R range, the N range, or the engine brake operation at the first forward speed, the seventh forward speed is not established, and the P range is maintained when the vehicle is in the P range, the shift range is shifted to the N range when the vehicle is in the R range, the N range is maintained when the vehicle is in the N range, and the shift range is shifted to the N range when the vehicle is in the engine brake operation of the first forward speed. Thus, the traveling safety of the vehicle can be ensured.

[Operation After Occurrence of All-Solenoids-Off Failure]

Next, a limp-home function of the second computer 72 and the second command system 72a after occurrence of the all-solenoids-off failure of the first command system 71a will be described below.

As described above, if the all-solenoids-off failure of the first command system 71a occurs when the vehicle is traveling in a forward travel range (except for the engine braking operation at the first forward speed), the distribution switch valve 36 is located at the right-half position, and the reverse input pressure is input as respective reverse input pressures to the exhaust ports SL2c, SL3c of the linear solenoid valves SL2, SL3 through the oil passages f, f1, f2, f3, f4. This establishes the seventh forward speed (i.e., a fail-safe traveling state).

For example, if the driver operates the shift lever 81 to any of the N range, the R range, and the P range in this state, the second computer 72 responsively turns on the third solenoid valve S3, and the third solenoid valve S3 outputs the signal pressure $P_{S3}$. Thus, the signal pressure $P_{S3}$ is input to the hydraulic-fluid chamber 37a of the primary-pressure cutoff switch valve 37, and the spool 37p is switched to the right-half position against the biasing force of the spring 37s so as to disconnect the input port 37b and the output port 37c from each other, that is, to cut off the line pressure $P_L$ supplied to the oil passage a6, thereby stopping supply of the line pressure $P_L$ to the oil passage a8. Thus, the line passage $P_L$ is no longer supplied to the input port 35b of the primary-pressure switch valve 35, that is, the primary pressure of the reverse input pressure is cut off, and the line pressure $P_L$ is no longer reversely input to the exhaust ports SL2c, SL3c of the linear solenoid valves SL2, SL3 through the oil passages f, f1, f2, f3, f4. This establishes a neutral state (i.e., a fail-safe stopping state).

Moreover, for example, if the driver operates the shift lever 81 from the present neutral state to the D range, the second computer 72 responsively turns off the third solenoid valve S3, and the third solenoid valve S3 stops outputting the signal pressure $P_{S3}$. Thus, the signal pressure $P_{S3}$ of the hydraulic-fluid chamber 37a of the primary-pressure cutoff switch valve 37 stops acting, and the spool 37p is switched to the left-half position by the biasing force of the spring 37s, whereby the input port 37b and the output port 37c communicate with each other, that is, the line pressure $P_L$ is supplied again to the oil passage a8. Thus, the line pressure $P_L$ is supplied again to the input port 35b of the primary-pressure switch valve 35, and the reverse input pressure is reversely input to the exhaust ports SL2c, SL3c of the linear solenoid valves SL2, SL3 through the oil passages f, f1, f2, f3, f4. As a result, the seventh forward speed is established (i.e., the fail-safe traveling state), as in the case where the all-solenoids-off failure of the first command system 71a occurs when the vehicle is traveling in a forward travel range.

On the other hand, for example, if the all-solenoids-off failure of the first command system 71a occurs when the vehicle is in the R range, the N range, or the engine braking operation at the first forward speed, the distribution switch valve 36 is located at the left-half position, and the reverse input pressure is cut off between the oil passages f, f1. Thus, no reverse input pressure is input to the exhaust ports SL2c, SL3c of the linear solenoid valves SL2, SL3, whereby the neutral state is established (i.e., the fail-safe stopping state).

For example, if the driver operates the shift lever 81 from the state described above to the D range, the second computer 72 responsively turns on the third solenoid valve S3 temporarily, and the third solenoid valve S3 outputs the signal pressure $P_{S3}$. Thus, the signal pressure $P_{S3}$ is input to the input port 38a of the check ball valve 38 through the oil passages d, d2, thereby moving the check ball 38B. As a result, the signal pressure $P_{S3}$ is output from the output port 38c, and is input to the second hydraulic-fluid chamber 36h of the distribution switch valve 36 through the oil passage 1. Thus, the spool 36p of the distribution switch valve 36 is switched to the right-half position, and the line pressure $P_L$ is input to the input oil chamber 36c through the oil passage a17, whereby the spool 36p is locked to the right-half position.

Then, the second computer 72 turns off the third solenoid valve S3, and the third solenoid valve S3 stops outputting the signal voltage $P_{S3}$. Thus, as described above, the signal pressure $P_{S3}$ of the hydraulic-fluid chamber 37a of the primary-pressure cutoff switch valve 37 stops acting, and the spool 37p is switched to the left-half position by the biasing force of the spring 37s, whereby the input port 37b and the output port 37c communicate with each other, that is, the line pressure $P_L$ is supplied again to the oil passage a8. Thus, the line pressure $P_L$ is supplied again to the input port 35b of the primary-pressure switch valve 35, and the reverse input pressure is reversely input to the exhaust ports SL2c, SL3c of the linear solenoid valves SL2, SL3 through the oil passages f, f1, f2, f3, f4. As a result, the seventh forward speed is established (i.e., the fail-safe traveling state), as in the case where the all-solenoids-off failure of the first command system 71a occurs when the vehicle is traveling in a forward travel range.

For example, if the driver operates the shift lever 81 from the state described above to any of the N range, the R range, and the P range, the second computer 72 responsively turns on the third solenoid valve S3, and the third solenoid valve S3 outputs the signal pressure $P_{S3}$. Thus, the signal pressure $P_{S3}$ is input to the hydraulic-fluid chamber 37a of the primary-pressure cutoff switch valve 37, and the spool 37p is switched to the right-half position against the biasing force of the spring 37s so as to disconnect the input port 37b and the output port 37c from each other, that is, to cut off the line pressure $P_L$ supplied to the oil passage a6, thereby stopping supply of the line pressure $P_L$ to the oil passage a8. Thus, the line passage $P_L$ is no longer supplied to the input port 35b of the primary-pressure switch valve 35, that is, the primary pressure of the reverse input pressure is cut off, and the line pressure $P_L$ is no longer reversely input to the exhaust ports SL2c, SL3c of the linear solenoid valves SL2, SL3 through the oil passages f, f1, f2, f3, f4. This establishes a neutral state (i.e., a fail-safe stopping state).

Thus, even if the all-solenoids-off failure of the first command system 71a occurs when the vehicle is in the D range, or even if the all-solenoids-off failure of the first command system 71a occurs when the vehicle is in the R range or the N range, the second computer 72 and the second command system 72a can establish the seventh forward speed when the shift range is shifted to the D range, and can establish the neutral state when the shift range is shifted to the P range, the R range, or the N range. That is, even after the all-solenoids-off failure of the first command system 71a occurs, the limp-home function for switching between the traveling mode and the non-traveling mode can be enhanced by the second computer 72 and the second command system 72a.

Note that, after the all-solenoids-off failure of the first command system 71a occurs, the parking switch valve 32 is locked to the right-half position as long as the line pressure $P_L$ input from the input port 32b is applied to the parking switch valve 32, and the operation mode is locked to the parking release state. The second solenoid valve S2 is not turned on based on the all-solenoids-off failure of the first command system 71a. However, once the engine is stopped, and generation of the line pressure $P_L$ is stopped, the locked state of the parking switch valve 32 is released. Thus, the hydraulic pressure is no longer applied to the parking cylinder 33, whereby the parking state is established. Moreover, once the engine is stopped, application of the line pressure $P_L$ to the input oil chamber 36c of the distribution switch valve 36 is discontinued, whereby the locked state of the distribution switch valve 36 is released, and the distribution switch valve 36 switches to the left-half position. Once the engine is stopped, the second command system does not turn on the third solenoid valve S3, and the distribution switch valve 36 keeps the reverse input pressure (i.e., between the oil passages f, f1) in the cut-off state. Thus, the seventh forward speed is not established, and the parking state is maintained.

As described above, the hydraulic control device 20 of the present invention is capable of controlling all the shift speeds (the first forward speed to the eighth forward speed, and the reverse speed) by the first command system 71a in the normal state, and is capable of switching between the fail-safe traveling state and the fail-safe stopping state by the second command system 72a when a failure occurs in the first command system 71a. Thus, even if a failure occurs in the first command system 71a, it is possible to switch between the traveling state of the seventh forward speed and the neutral state by the second command system 72a. Thus, the limp-home function can be enhanced.

Moreover, since the supply position (the left-half position) and the cutoff position (the right-half position) of the primary-pressure cutoff switch valve 37 are switched based on the signal pressure $P_{S3}$ of the third solenoid valve S3, application and non-application of the primary pressure (the reverse input pressure) to the hydraulic servos 52, 53 can be reliably switched when a failure occurs in the first command system 71a. That is, the fail-safe traveling state and the fail-safe stopping state can be reliably switched when a failure occurs in the first command system 71a.

Moreover, when the first command system 71 is in a normal state, the fail-safe traveling state and the fail-safe stopping state are switched by the distribution switch valve 36 that distributes the engagement pressure $P_{SL2}$ of the linear solenoid valve SL2 to the hydraulic servo 52 or the hydraulic servo 62 in the N range, the R range, and the P range, and in the D range. Thus, the fail-safe stopping state can be established when a failure of the first command system 71a occurs in the N range, the R range, and the P range, and the fail-safe running state can be established when a failure of the first command system 71a occurs in the D range (except for the engine braking operation at the first forward speed). Moreover, when the first command system 71a has a failure, the fail-safe traveling state and the fail-safe stopping state can be switched by controlling the third solenoid valve S3 and the primary-pressure cutoff switch valve 37 by the second command system 72a.

Moreover, the distribution switch valve 36 is structured so as to receive the signal pressure $P_{S3}$ of the third solenoid valve S3 in the second hydraulic-fluid chamber 36h when the first command system 71a has a failure. Thus, when the first command system 71a has a failure, the distribution switch valve 36 can be switched between the left-half position for the reverse input pressure is cut off, and the right-half position at which the reverse input pressure is transmitted, by the signal pressure $P_{S3}$ of the third solenoid valve S3. Thus, for example, even if a failure occurs in the first command system 71a in the N range or the R range, and the distribution switch valve 36 is located at the left-half position, the distribution switch valve 36 can be switched to the right-half position by the second command system 72a. That is, the traveling state and the non-travel state can be switched even after a failure occurs in the first command system 71a. Thus, the limp-home function can be enhanced.

Moreover, the hydraulic control device of the present invention includes the first and second solenoid valves S1, S2 that are driven by operation of the shift lever 81 and set the shift range (especially the P range and other ranges) inside the automatic transmission. That is, the shift range of the automatic transmission is switched by electric commands. Thus, because the hydraulic control device of the present invention is not configured so that the shift range is manually switched, shifting of the shift range becomes impossible when a failure occurs in the first command system 71a. However, the fail-safe traveling state and the fail-safe stopping state can be switched by the second command system 72a, whereby the limp-home function can be enhanced.

Moreover, the hydraulic control device of the present invention includes the first computer 71 that generates electric commands of the first command system 71a, and the second computer 72 in which at least wires thereof are formed in a separate system from that of the first computer 71, and that generates electric commands of the second command system 72a. Thus, the limp-home function can be enhanced by the second command system 72a of the second computer 72, even if a failure occurs in the first command system 71a due to, for example, a failure of the first computer 71, disconnection of wires connected to the first computer 71, coming-off of connectors, or the like.

Moreover, the hydraulic control device of the present invention includes the first computer 71 that generates electric commands of the first command system 71a, and the second computer 72 in which at least wires thereof are formed in a separate system from that of the first computer 71, and that generates electric commands of the second command system 72a. Thus, the limp-home function can be enhanced by the second command system 72a of the second computer 72, even if a failure occurs in the first command system 71a due to, for example, a failure of the first computer 71, disconnection of wires connected to the first computer 71, coming-off of connectors, or the like.

The hydraulic control device for an automatic transmission of the present invention can be used in automatic transmissions which are mounted on passenger cars, trucks, buses, agricultural machines, and the like. The hydraulic control device for an automatic transmission of the present invention is preferably used especially in an automatic transmission which employs a shift-by-wire system, and which enables the driver to select forward traveling and neutral even after an all-solenoids-off failure occurs.

What is claimed is:

1. A hydraulic control device for an automatic transmission, which is structured so as to establish a plurality of shift speeds by using a plurality of first system solenoid valves which are controlled by a first command system, and so as to establish a fail-safe running state where a primary pressure is supplied to a corresponding hydraulic servo of at least one of friction engagement elements which establishes a predetermined one of the shift speeds, or a fail-safe stopping state where a primary pressure to the hydraulic servos of all of the friction engagement elements is cut off, when a failure occurs in the first command system, the hydraulic control device, comprising a second system solenoid valve that is controlled by a second command system and that controls an output state of a signal pressures;

a first computer that generates an electric command of the first command system; and a second computer in which at least wires thereof are formed in a separate system from that of the first computer, and that generates an electric command of the second command system, wherein the fail-safe traveling state and the fail-safe stopping state are switched by the signal pressure of the second system solenoid valve.

2. The hydraulic control device for an automatic transmission according to claim 1, further comprising:

a second system switch valve which is switched between a supply position at which the primary pressure is supplied to the hydraulic servo of the friction engagement element which establishes the predetermined shift speed in the fail-safe traveling state and a cutoff position at which the primary pressure is cut off, based on the signal pressure of the second system solenoid valve, wherein the fail-safe traveling state and the fail-safe stopping state are switched by switching the supply position and the cutoff position.

3. The hydraulic control device for an automatic transmission according to claim 2, wherein the first system solenoid valve includes a plurality of engagement-pressure control solenoid valves that regulate and control respective engagement pressures to be supplied to the hydraulic servos of the friction engagement elements establishing all of the shift speeds, and a fail solenoid valve that outputs a fail signal pressure when the failure occurs the hydraulic control device for an automatic transmission further comprising:

a distribution switch valve that distributes an engagement pressure from one of the engagement-pressure control solenoid valves to two of the hydraulic servos;

a primary-pressure switch valve which is switched from a supply position at which the primary pressure is supplied to the engagement-pressure control solenoid valves, to a reverse input position at which, when the fail signal pressure is received, a reverse input pressure is input to exhaust ports of two of the engagement-pressure control solenoid valves connected to the hydraulic servo of the friction engagement element which establishes the predetermined shift speed so that the primary pressure is supplied to the two hydraulic servos; and a reverse input oil passage that transmits the reverse input pressure from the primary-pressure switch valve to the exhaust ports of the two engagement-pressure control solenoid valves through the distribution switch valve, wherein the distribution switch valve is controlled to be located at a first position where the engagement pressure is supplied to one of the two hydraulic servos at least in a reverse travel range, a non-travel range, and at a specific shift speed in a forward travel range, and is controlled to be located at a second position where the engagement pressure is supplied to the other hydraulic servo in other forward travel ranges, and the distribution switch valve provides a communication with the reverse input oil passage at the second position and cuts off the reverse input oil passage at the first position, and the second system switch valve switches the fail-safe traveling state and the fail-safe stopping state by switching supply and cutoff of the reverse input pressure by switching supply and cutoff of the primary pressure to the primary-pressure switch valve.

4. The hydraulic control device for an automatic transmission according to claim 3, wherein
the distribution switch valve includes
a biasing unit that biases a spool to the first position,
a forward-travel engagement-pressure input oil chamber that receives an engagement pressure, which is supplied to the corresponding hydraulic servo of at least one of the friction engagement elements engaged upon starting of forward traveling when the first command system is in a normal state so as to switch the spool to the second position against biasing force of the biasing unit,
a lock-pressure input oil chamber that receives a lock pressure at the second position to lock the spool to the second position, and
an unlock-pressure input oil chamber that receives an unlock pressure for returning the spool, which is locked to the second position, to the first position, and
the forward-travel engagement-pressure input oil chamber is structured so as to receive the signal pressure of the second system solenoid valve when the failure occurs in the first command system.

5. The hydraulic control device for an automatic transmission according to claim 1, wherein
the first system solenoid valve includes a range setting solenoid valve that is driven based on an operation of shift-range operating unit and that sets a shift range inside the automatic transmission.

* * * * *